US012511871B2

(12) United States Patent
Chen et al.

(10) Patent No.: US 12,511,871 B2
(45) Date of Patent: Dec. 30, 2025

(54) SCALABLE NEURAL TENSOR NETWORK WITH MULTI-ASPECT FEATURE INTERACTIONS

(71) Applicant: Visa International Service Association, San Francisco, CA (US)

(72) Inventors: Huiyuan Chen, San Jose, CA (US); Yu-San Lin, Mountain View, CA (US); Fei Wang, Fremont, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 286 days.

(21) Appl. No.: 18/550,356

(22) PCT Filed: Sep. 23, 2021

(86) PCT No.: PCT/US2021/051686
§ 371 (c)(1),
(2) Date: Sep. 13, 2023

(87) PCT Pub. No.: WO2022/231647
PCT Pub. Date: Nov. 3, 2022

(65) Prior Publication Data
US 2024/0185565 A1    Jun. 6, 2024

Related U.S. Application Data

(60) Provisional application No. 63/182,671, filed on Apr. 30, 2021.

(51) Int. Cl.
*G06V 10/74* (2022.01)
*G06V 10/80* (2022.01)
*G06V 10/82* (2022.01)

(52) U.S. Cl.
CPC ............ *G06V 10/761* (2022.01); *G06V 10/80* (2022.01); *G06V 10/82* (2022.01)

(58) Field of Classification Search
CPC ....... G06V 10/761; G06V 10/82; G06V 10/80
See application file for complete search history.

(56) References Cited

U.S. PATENT DOCUMENTS 10,109,051 B1 * 10/2018 Natesh .................... G06V 20/10
10,176,198 B1 *  1/2019 Dhua ..................... G06V 10/761
(Continued)

FOREIGN PATENT DOCUMENTS

| KR | 20180017597 A | 2/2018 | |
|---|---|---|---|
| WO | WO-2018228448 A1 * | 12/2018 | ......... G06Q 30/0631 |
| WO | 2020085786 A1 | 4/2020 | |

OTHER PUBLICATIONS

Feng et al., "Interpretable Partitioned Embedding for Intelligent Multi-item Fashion Outfit Composition" (pp. 61:1-61:20). (Year: 2019).*

(Continued)

*Primary Examiner* — Manav Seth
(74) *Attorney, Agent, or Firm* — Kilpatrick Townsend & Stockton LLP

(57) ABSTRACT

A method includes determining a set of regions for each of a first plurality of images of a first item type, a second plurality of images of a second item type, and a third plurality of images of a third item type. The method also includes for each region in each set of regions of the images, generating, by the processing computer, a vector representing the region, and then generating a plurality of aggregated messages using the vectors corresponding to combinations of images of different types of items, the images being from the first, second, and third plurality of images. Then, unified embeddings are generated for the images in the first, second, and third plurality of images, respectively, using aggregated (Continued)

messages in the plurality of aggregated messages. Matching scores associated with combinations of the images are created using the unified embeddings and a machine learning model.

20 Claims, 6 Drawing Sheets

(56) References Cited

U.S. PATENT DOCUMENTS

| | | | | |
|---|---|---|---|---|
| 10,452,954 | B2* | 10/2019 | Schroff | G06V 10/774 |
| 10,776,626 | B1* | 9/2020 | Lin | G06V 10/82 |
| 11,475,500 | B2* | 10/2022 | Ning | G06V 10/82 |
| 11,475,665 | B1* | 10/2022 | Lin | G06V 10/758 |
| 11,574,353 | B2* | 2/2023 | Polanía Cabrera | G06V 10/82 |
| 11,580,363 | B2* | 2/2023 | Taslakian | G06N 3/042 |
| 11,907,987 | B2* | 2/2024 | Afshar | G06Q 30/0623 |
| 11,935,106 | B2* | 3/2024 | Yang | G06Q 30/0627 |
| 12,124,947 | B2* | 10/2024 | Wu | G06N 3/045 |
| 2011/0191374 | A1* | 8/2011 | Bengio | G06F 16/53 |
| | | | | 707/E17.014 |
| 2015/0161674 | A1* | 6/2015 | Khoury | G06Q 30/0631 |
| | | | | 715/764 |
| 2015/0379003 | A1* | 12/2015 | Dorner | G06F 16/54 |
| | | | | 707/772 |
| 2021/0224582 | A1* | 7/2021 | Afshar | G06N 20/10 |
| 2023/0115395 | A1* | 4/2023 | Tendulkar | G06V 10/776 |
| | | | | 705/26.7 |
| 2025/0221658 | A1* | 7/2025 | Tendulkar | G06T 7/90 |

OTHER PUBLICATIONS

Yu et al., "Aesthetic-based Clothing Recommendation," WWW 2018, Apr. 23-27, 2018, Lyon, France, pp. 649-658.

Chen et al., Neural Tensor Model for Learning Multi-Aspect Factors in Recommender Systems, Proceedings of the Twenty-Ninth International Joint Conference on Artificial Intelligence (IJCAI-20), pp. 2449-2455. , Jul. 7, 2021.

Li et al., "Fashion Recommendation with Multi-Relational Representation Learning", PAKDD 2020: Advances in knowledge Discovery and Data Mining, LNCS, vol. 12084, May 2020, pp. 3-15.

Li et al., "Multideep Feature Fusion Algorithm for Clothing Style Recognition", Hindawi, Wireless Communications and Mobile Computing, vol. 2021, Article ID 5577393, Apr. 17, 2021, 14 pages.

Min et al., "Explainable Fashion Recommendation: A Semantic Attribute Region Guided Approach", Proceedings of the Twenty-Eighth International Joint Conference on Artificial Intelligence (IJCAI-19), Aug. 31, 2019, pp. 4681-4688.

PCT/US2021/051686 , "International Search Report and Written Opinion", Jan. 26, 2022, 10 pages.

Chen et al., "Neural Tensor Model for Learning Multi-Aspect Factors in Recommender Systems", Proceedings of the Twenty-Ninth International Joint Conference on Artificial Intelligence, Jul. 1, 2020, pp. 2449-2455.

Chen et al., "Tops, Bottoms, and Shoes: Building Capsule Wardrobes via Cross-Attention Tensor Network", 13th International Conference on Automotive User Interfaces and Interactive Vehicular Applications, Acmpub27, New York, USA, Sep. 13, 2021, pp. 453-462.

EP21939574.6 , "Extended European Search Report", Sep. 17, 2024, 8 pages.

Han et al., "Neural Compatibility Modeling With Probabilistic Knowledge Distillation", Institute of Electrical and Electronics Engineers Transactions on Image Processing, vol. 29, 2020, pp. 871-882.

Hsiao et al., "Creating Capsule Wardrobes From Fashion Images", Available Online at: https://arxiv.org/pdf/1712.02662, Dec. 7, 2017, pp. 1-15.

Moosaei et al., "Fashion Recommendation and Compatibility Prediction Using Relational Network", Available Online at: https://arxiv.org/pdf/2005.06584, May 13, 2020, pp. 1-10.

\* cited by examiner

SCALABLE NEURAL TENSOR NETWORK WITH MULTI-ASPECT FEATURE INTERACTIONS

CROSS-REFERENCES TO RELATED APPLICATIONS

This application is a National Stage of International Application No. PCT/US2021/051686, filed Sep. 23, 2021, which claims the benefit of U.S. Provisional Application No. 63/182,671, filed Apr. 30, 2021, which are herein incorporated by reference in its their entirety for all purposes.

BACKGROUND

Images contain rich information regarding aesthetics, context, and relations between items, and recent developments on visually aware recommender systems have taken images into account. One exemplary utilization for such recommendation systems is in fashion.

However, there are many problems in recommendation engines. For example, it is difficult to determine and take multi-item compatibility into account (e.g., in a fashion use case, compatibility between a hat, a top, a bottom, shoes, a bag, etc.). Further, it is difficult to determine how to exploit visual signals from items (e.g., exploiting global and local visual signals). Another problem is scalability. Current methods are not scalable in terms of time and memory in relation to the quality of results from those methods.

Embodiments of the disclosure address this problem and other problems individually and collectively.

SUMMARY

One embodiment is related to a method comprising: determining, by a processing computer, a set of regions for each of a first plurality of images of a first item type, a second plurality of images of a second item type, and a third plurality of images of a third item type; for each region in each set of regions of the first plurality of images, the second plurality of images, and the third plurality of images, generating, by the processing computer, a vector representing the region; generating, by the processing computer, a plurality of aggregated messages using the vectors corresponding to combinations of images of different types of items, the images being from the first, second, and third plurality of images; generating, by the processing computer, unified embeddings for the images in the first, second, and third plurality of images, respectively, using aggregated messages in the plurality of aggregated messages; and creating, by the processing computer, matching scores associated with combinations of the images of the first item type, the second item type, and the third item type using the unified embeddings and a machine learning model.

Another embodiment of the invention is related to a processing computer comprising: a processor; and a computer-readable medium coupled to the processor, the computer-readable medium comprising code executable by the processor for implementing a method comprising: determining a set of regions for each of a first plurality of images of a first item type, a second plurality of images of a second item type, and a third plurality of images of a third item type; for each region in each set of regions of the first plurality of images, the second plurality of images, and the third plurality of images, generating a vector representing the region; generating a plurality of aggregated messages using the vectors corresponding to combinations of images of different types of items, the images being from the first, second, and third plurality of images; generating unified embeddings for the images in the first, second, and third plurality of images, respectively, using aggregated messages in the plurality of aggregated messages; and creating matching scores associated with combinations of the images of the first item type, the second item type, and the third item type using the unified embeddings and a machine learning model.

Further details regarding embodiments of the disclosure can be found in the Detailed Description and the Figures.

DETAILED DESCRIPTION

Figure 1:
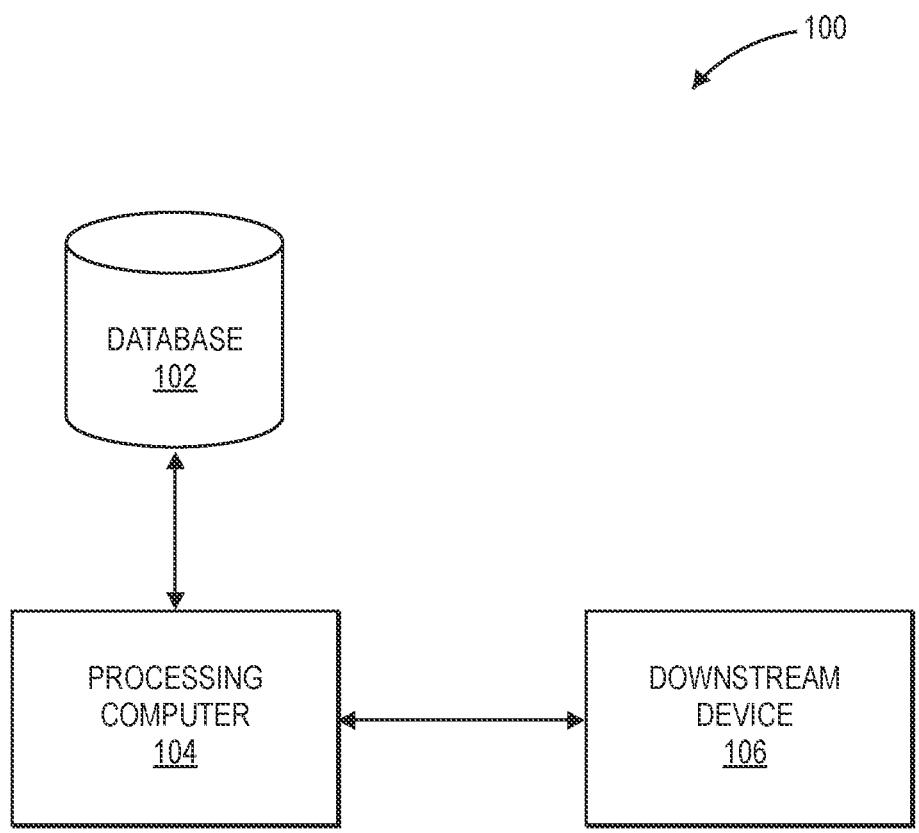
FIG. 1 shows a block diagram of a system according to some embodiments.

Prior to discussing embodiments of the disclosure, some terms can be described in further detail.

An "image" can include a visible impression obtained by a camera, telescope, microscope, or other device, or displayed on a computer or video screen. An image can include an item of a particular item type.

An "item type" can include a category of an item that indicates common characteristics of items of the item type. An item type can be a classification of an item in an image. For example, an image of a shirt can have an item type of shirt (i.e., a top).

A "region" can include a portion of a larger whole. A region of an image can include a particular section of an image. A region can include a particular spatial portion of an image (e.g., left half, top third, center 50%, etc.) or a categorical portion of an image (e.g., a pocket of the shirt in the image, a button on the shirt in the image, the left sleeve of the shirt in the image, etc.).

An "aggregated message" can include a collection of information. In some embodiments, an aggregated message can be a collection of information that indicates how much a particular data item (e.g., a vector representative of a region of an image) affects another data item (e.g., a different vector representative of a different region of the image or another image). For example, an aggregated message can include information that indicates how much a vector indicative of a first region of a first image affects a first region of a second image.

An "affinity matrix" can include a matrix indicating a similarity of characteristics or features between two objects. In some embodiments, an affinity matrix can indicate a similarity of characteristics or features between two images. For example, an affinity matrix can be constructed based on the vectors of each region of a first image and the vectors of each region of a second image.

A "directional pair" can include a set of two objects (e.g., images) with an indicated direction between the two objects. A directional pair can indicate a direction of influence between two objects. For example, a directional pair can include a first image and a second image, where the directional pair indicates a direction from the first image to the second image. An aggregated message can be determined for the directional pair such that the aggregated message indicates the influence that the first image has on the second image. Another directional pair can indicate a direction from the second image to the first image. For example, a directional pair can include an image of a pair of shoes and an image of a shirt, with an indicated direction (e.g., influence) between them.

A "feature" can include an individual measureable property or characteristic of a phenomenon. A feature can be numeric (e.g., a value, a vector, a matrix, etc.) or structural (e.g., strings, graphics, etc.). A numeric feature can be described by a feature vector.

"Fused region-wise feature elements" can include combined feature data for a region. Fused region-wise feature elements can be formed from one or more aggregated messages for a region of an image and a vector representing the region. Fused region-wise feature elements can represent the region of an image and the influence another image's region has on the region of the image.

An "embedding" can be a relatively low-dimensional space into which high-dimensional vectors can be translated. In some embodiments, an embedding can be a mapping of a discrete—categorical—variable to a vector of continuous numbers. In the context of neural networks, embeddings can be low-dimensional, learned continuous vector representations of discrete variables. Neural network embeddings can reduce the dimensionality of categorical variables and meaningfully represent categories in a transformed space.

A "unified embedding" can include an embedding that represents a whole. A unified embedding can be an embedding that represents an image. A unified embedding that represents an image can be created based on fused region-wise feature elements for the regions in the image.

A "matching score" can include a value indicating how much items correspond to one another. A matching score can indicate how much three different specific item types (e.g., a top, a bottom, and a shoe) from three different images match when viewed as a whole. For example, the three different item types can include a top, bottom, and a shoe, and the matching score may indicate how compatible they are (e.g., visually compatible) in an outfit. In some embodiments, a matching score can be referred to as a "compatibility score."

The term "artificial intelligence model" or "machine learning model" can include a model that may be used to predict outcomes in order to achieve a pre-defined goal. A machine learning model may be developed using a learning algorithm, in which training data is classified based on known or inferred patterns.

"Machine learning" can include an artificial intelligence process in which software applications may be trained to make accurate predictions through learning. The predictions can be generated by applying input data to a predictive model formed from performing statistical analyses on aggregated data. A model can be trained using training data, such that the model may be used to make accurate predictions. The prediction can be, for example, a classification of an image (e.g., identifying images of cats on the Internet) or as another example, a recommendation (e.g., a movie that a user may like or a restaurant that a consumer might enjoy).

In some embodiments, a model may be a statistical model, which can be used to predict unknown information from known information. For example, a learning module may be a set of instructions for generating a regression line from training data (supervised learning) or a set of instructions for grouping data into clusters of different classifications of data based on similarity, connectivity, and/or distance between data points (unsupervised learning). The regression line or data clusters can then be used as a model for predicting unknown information from known information. Once a model has been built from learning module, the model may be used to generate a predicted output from a new request. A new request may be a request for a prediction associated with presented data. For example, a new request may be a request for classifying an image or for creating a recommendation for a user.

A "perceptron" can be a type of machine learning process. A perceptron can be an algorithm for supervised learning of binary classifiers. A binary classifier can be a function that can decide whether or not an input, represented by a vector of numbers, belongs to some specific class.

A "multilayer perceptron" (MLP) can be a type of feedforward artificial neural network (ANN). A multilayer perceptron can include multiple layers of perceptron. For example, a multilayer perceptron can include of three or more layers (e.g., an input layer, an output layer, and one or more hidden layers) of nonlinearly-activating nodes. Multilayer perceptron can be fully connected, therefore each node in one layer connects with a certain weight to every node in the following layer.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may also include a cloud based server computer. The server computer may comprise one or more computational apparatuses and may use any of a variety of computing structures, arrangements, and compilations for servicing the requests from one or more client computers.

I. INTRODUCTION

Embodiments relate to scalable neural tensor networks. Embodiments provide for systems and methods for creating machine learning models and match scores for a plurality of items. Match scores can indicate how compatible one or more items are when used together. The one or more items can be any items, which may depend upon the use case of the implementation. The one or more items can be fashion items (e.g., hats, shirts, etc.), interaction data (e.g., product codes, amounts, etc.), research articles, financial services, books, and/or anything that can be captured as an image and input into the system.

Examples herein will describe situations where the one or more items are fashion items. However, it is understood that embodiments are not limited thereto. Fashion is about how people express their interests, identity, mood, and cultural influences. Given an inventory of candidate garments from different catalogs, one large question is what selection of candidate garments appears most fashionable. This question presents an intriguing visual recommendation challenge to automatically create capsule wardrobes. Capsule wardrobe generation is a complex technical combinatorial problem that requires capturing how multiple visual items interact. The generative process often requires fashion experts to manually extract the combinations out, making it hard to scale.

Embodiments solve this technical visual recommendation problem by introducing TensorNet, an approach that captures key ingredients of visual compatibility among item types (e.g., tops, bottoms, shoes, etc.). Embodiments, which may be summarily referred to as TensorNet, can provide actionable recommendations for a full-body clothing outfit that will mix and match well. Embodiments can include two segments: 1) a cross-attention message passing segment and 2) a wide and deep tensor interaction segment. As such, embodiments are able to characterize local region-based patterns as well as global compatibility of the entire outfits.

Clothing is used strategically to manage bodily appearance. With the right combination of clothing items, not only can one accurately convey their social class, but also express their subcultural identities [14]. However, searching for the right outfit is time-consuming: people may try on as many as 20 pairs of jeans before making an apparel purchase [4]. More often, one might lack the capability of putting outfits together, and have to frequently refer to more established individuals (e.g., influencers, celebrities, etc.) for inspiration [13, 40].

The search for the underlying theory of combining clothing items together dates all the way back to the 18th century, where the rules of how to put specific clothing items together to form an appropriate outfit, given the dresser and the occasion were thoroughly studied. Concrete suggestions for women such as "the hoods may be made of satin to match the lining and frill of the jacket, but should be lined with fine white cashmere" was given as specific instruction [6]. Similarly, for men, " . . . a jacket of this, made like the English army tunic, knicker breeches of slightly lighter shade, stockings to match, low brown shoes, champagne—colored silk shirt, white collar and red tie" [1]. There were even educational resources created to teach children how to create cohesive outfits starting from dressing their dolls [31].

However, even though there was tremendous demand in learning how to dress and how to put together outfits, more systematic and quantitative approaches were only proposed and developed in recent years thanks to the accessibility of data.

Many attempts have been made to model the compatibility of fashion items [16, 38, 41, 48]. However, despite the well-established fashion theory developed in the past two centuries, there still is a lack of theory-based design that learns the outfit compatibility.

Various embodiments can determine visual recommendations based on three central viewpoints. The first point of view is from the overall outfit level, instead of viewing every piece in the outfit as equal contribution to the overall aesthetics and compatibility, focusing on the core pieces can bring out more insights. The second viewpoint is from the inter-item level. The proximity and locality among items play an important role in the item compatibility, because items that are closer together affect each other's compatibility more compared to those that are further apart from each other. The third viewpoint is from the intra-item level, an item's contribution to its compatibility with others often come from a specific detail of the item, rather than the complete design of the item. Below embodiments further elaborate on the three viewpoints.

Each apparel item in an outfit can be viewed as an aesthetic object [35]. It can be natural for a wearer to match apparel items that are closer on their bodies. Although intuitive, such concept has not yet been adopted in the research of fashion compatibility. As described in detail herein, embodiments purposefully provide for message passing mechanisms across items that are closer to each other in terms of their proximity. More specifically, embodiments enable information to exchange between a top and a bottom, as well as a bottom and a shoe. This particular design captures the essence of aesthetic objects' physical proximity correlates with their weights of compatibility, and aligns with the approach proposed to capture style compatibility.

As a non-fashion example, the message passing mechanism can allow information exchange between connected items, which are not necessarily connected by physical proximity, but by categorical proximity. For example, research papers can be evaluated to determine similarity between the research papers. Information exchange may occur between research papers that are categorically similar (e.g., research papers categorized as biology, chemistry, or physics, etc.).

In addition to the compatibility across items according to each individual item's design, the detailed designs within each item also affect the overall outfit quality significantly. Although many works have been proposed to determine fashion styles and clothing attribute given images [39], leveraging these to further conduct compatibility learning is still lacking. What is more, most of the attempts have depended on labeled data or pre-trained models [25], which makes it hard to scale up and understand unseen style elements. To solve this technical problem, as described herein, embodiments provide for a region-wise feature map approach that can extract regional features from the given images of clothing items in an unsupervised manner. The extracted information is then passed to the cross-attention message passing process, as mentioned above in the second key model design concept.

This is the first work that views the outfit compatibility problem in a core-piece setting, considers item proximity, and incorporates unsupervised region-wise feature map extraction. These three components are inspired the theories developed in the aesthetic computing and fashion research communities.

The proposed model is evaluated on two large fashion visual datasets: Polyvore and iFashion. Two quantitative evaluation tasks are conducted to perform compatibility prediction and fill-in-the-blank prediction. Through comparison with numerous state-of-the-arts, embodiments outperform prior methods significantly.

Further, two qualitative tasks are performed using embodiments: 1) capsule wardrobe generation and 2) clothing region extraction. It is shown that through the proposed tensor factorization approach, embodiments can generate triplet of compatible items very efficiently, compared to more traditional approach. In addition, extracted regional features also effectively capture the detailed designs of the clothing items.

II. RELATED WORK

Prior to further discussing various embodiments, tensor factorization and cross-attention networks will be briefly described.

A. Tensor Factorization

Tensors are powerful tools to model multi-modal information [26]. Tensor factorizations, built upon the multi-linear tensor algebra, seek to fill the unobserved entries of partially observed tensors, which have been widely used in recommender systems [2, 15, 23, 34, 37, 50, 52]. For example, Rendle et al. introduced a tensor method to exploit the pairwise interactions between users, items and tags. Song et al. [37] presented a dynamic tensor model to deal with multi-aspect streaming data. Zhu et al. [52] proposed a fairness-aware tensor framework to investigate sensitive attributes in recommender systems. Yu et al [50] incorporated aesthetic features into a tensor factorization model to capture the aesthetic preference of consumers. Beyond these tensor-based models, embodiments build a new tensor model to study the triple-wise interactions among tops, bottoms, and shoes for outfit recommendation.

In addition to multi-linear tensor models, non-linear tensor factorizations have gained attention due to their effectiveness at learning complex patterns [18, 28, 45, 47]. Xu et al. [47] and He et al. [18] introduced a series of Gaussian kernels to capture non-linear relationships. Motivating from deep neural networks, Liu et al. [28] propose to use convolutional neural network to mine sparse tensor data, while Wu et al. [45] replaced the multi-linear operations with multi-layer perceptions to model complex relationships. However, as described herein, various embodiments, being more general, further increase the expressive power of non-linear tensor models by using wide and deep learning strategies, which have been successfully applied to two-dimensional matrix completion in recommender systems [10, 19].

B. Cross-Attention Network

Attention mechanisms aim to highlight important local regions to extract more meaningful features, which have been successfully used in various visual and textual tasks, including machine translation [42], image classification [21], and fashion recommendation [9]. Recently, attention mechanisms has also been applied to investigate the knowledge alignment between two objects in cross-modal tasks [21, 27, 43, 44, 49]. The key idea of cross-attention mechanisms is to enhance the compatibility between attention selections and feature representations given their semantic dependencies. For instance, Lee et al. [27] presented a stacked cross-attention network to infer the latent semantic alignment between visual regions and words in sentences, making image-text matching more interpretable. Hou et al. [21] introduced a cross-attention module to learn the semantic relevance between unseen classes and query features in few-shot classifications. As described herein, embodiments generate cross-attention maps for exploiting how the visual messages pass within the path:top ↔bottom ↔shoe, allowing to capture fine-grained interplay between neighboring items, for example top ↔bottom and bottom ↔shoe.

One challenge of cross-attention mechanisms is its quadratic time complexity for computing the softmax, which precludes their usage in settings with limited computational resources. Some recent work provides kernelizable attention techniques [11, 24, 32, 51]. However, embodiments further linearize the regular softmax attentions to reduce the time complexity of cross-attention modules, from quadratic to linear.

III. MATCHING SCORE DETERMINATION SYSTEM

FIG. 1 shows a system 100 according to embodiments of the disclosure. The system 100 comprises a database 102, a processing computer 104, and a downstream device 106. The processing computer 104 can be in operative communication with the database 102 and the downstream device 106.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The database 102 can include any suitable database. The database 102 may be a conventional, fault tolerant, relational, scalable, secure database such as those commercially available from Oracle™ or Sybase™. The database 102 can store images and other data that can be utilized by the processing computer 104 to determine a recommendation. For example, the database 102 can store a first plurality of images of a first item type, a second plurality of images of a second item type, and a third plurality of images of a third item type.

The processing computer 104 can include any suitable computing device (e.g., a server computer, a desktop computer, a user device, etc.). The processing computer 104 can process data retrieved from the database 102. The processing computer 104 can determine a recommendation based on data retrieved from the database 102. In some embodiments, the processing computer 104 can perform further processing using and/or based on the recommendation. In other embodiments, the processing computer 104 can provide the recommendation to the downstream device 106.

For example, the processing computer 104 can determine matching scores associated with combinations of images of differing types. The processing computer 104 can process, for example, three different types of images to determine a matching score that indicates how well a set of three images (one of each image type) match and relate to one another. For example, the processing computer 104 can determine matching scores for images types of couches, side tables, and lamps to determine how well the couch, side table, and lamp in the images work together aesthetically when placed in a room. The processing computer 104 can determine a matching score for each possible combination of couches, side tables, and lamps.

In some embodiments, the processing computer 104 can determine a largest matching score from the plurality of matching scores from each possible combination of image types. The processing computer 104 can provide the largest matching score to the downstream device 106 or to a user of the processing computer 104. The processing computer 104 can also provide the images of the couch, side table, and lamp that result in the largest matching score to the downstream device 106.

The downstream device 106 can be a device that receives data from the processing computer 104. The downstream device 106 can be a user device, a server computer, etc. For example, the downstream device 106 can be a user device that receives a recommendation created by the processing computer 104. The downstream device 106 can receive the recommendation and other data determined by the processing computer 104 and perform further processing.

Figure 2:
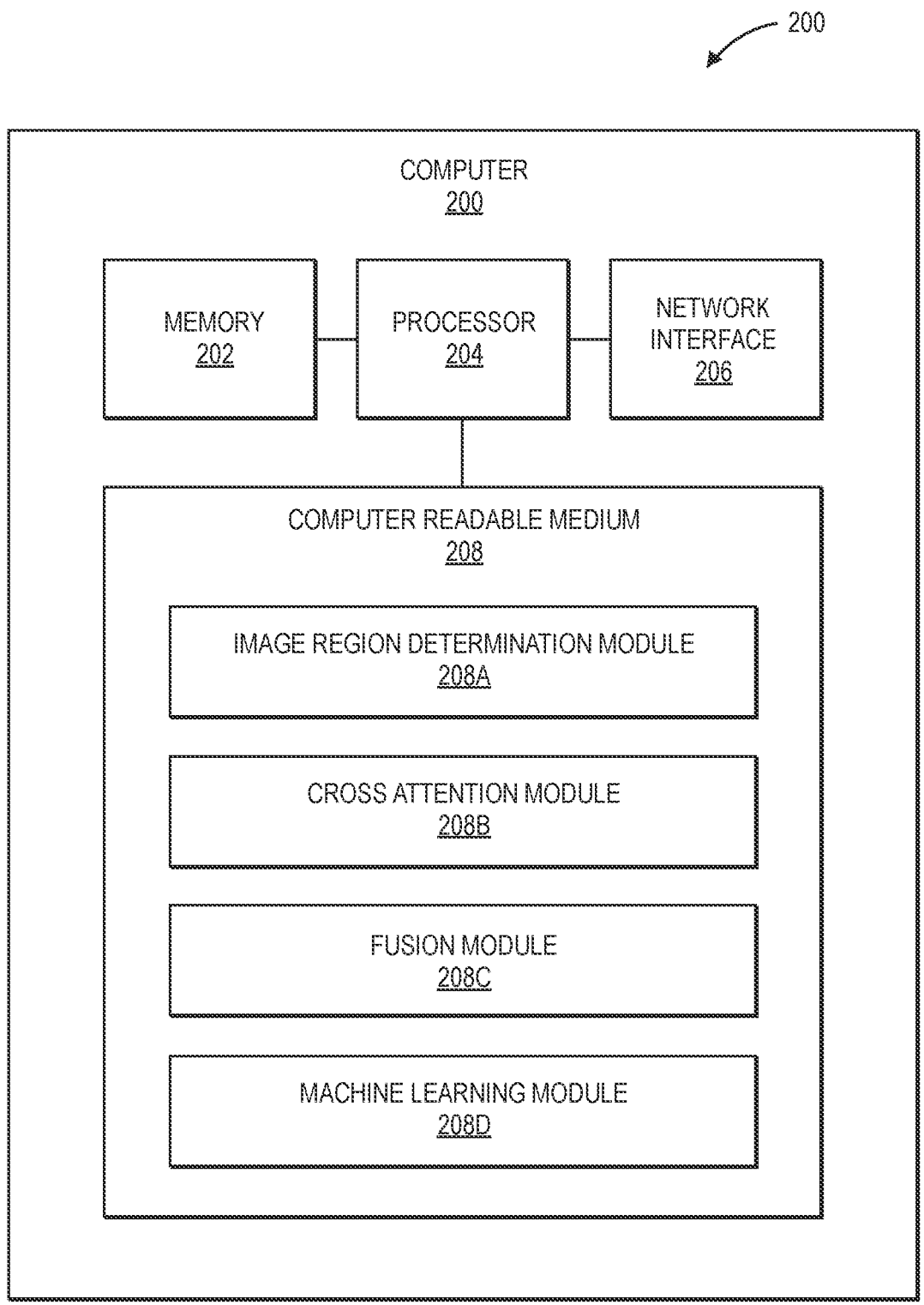
FIG. 2 shows a block diagram of components of a computer according to some embodiments.

FIG. 2 shows a block diagram of a computer 200 according to embodiments. The exemplary computer 200 may comprise a processor 204. The processor 204 may be coupled to a memory 202, a network interface 206, input elements 210, output elements 212, and a computer readable medium 208. The computer readable medium 208 can comprise one or more modules. The computer readable medium 208 comprises a image region determination module 208A, a cross attention module 208B, a fusion module 208C, and a machine learning module 208D. In some embodiments, the computer 200 may be in operative communication with a database (e.g., as illustrated in FIG. 1).

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store images, image data, weight values, determined values, and/or any values utilized in any process described herein.

The computer readable medium 208 may comprise code, executable by the processor 204, for performing a method comprising: determining a set of regions for each of a first plurality of images of a first item type, a second plurality of images of a second item type, and a third plurality of images of a third item type; for each region in each set of regions of the first plurality of images, the second plurality of images, and the third plurality of images, generating a vector representing the region; generating a plurality of aggregated messages using the vectors corresponding to combinations of images of different types of items, the images being from the first, second, and third plurality of images; generating unified embeddings for the images in the first, second, and third plurality of images, respectively, using aggregated messages in the plurality of aggregated messages; and creating matching scores associated with combinations of the images of the first item type, the second item type, and the third item type using the unified embeddings and a machine learning mode.

The image region determination module 208A may comprise code or software, executable by the processor 204, for determining regions of images. The image region determination module 208A, in conjunction with the processor 204, can determine one or more regions in an image. The image region determination module 208A can include a pre-trained that is trained to extract visual features from images. For example, image region determination module 208A can include a model that is pre-trained to identify visual features from tops, bottoms, and shoes, where the visual features can include sleeves, pockets, buttons, shapes, collars, seams, material types, etc.

For example, the image region determination module 208A, in conjunction with the processor 204, can determine region-wise feature maps from intermediate convolutional layers, as is done in ResNet50 [17], as known to one of skill in the art.

The cross attention module 208B may comprise code or software, executable by the processor 204, for performing an attention process across image types. The cross attention module 208B, in conjunction with the processor 204, can perform attentive pairwise matching. For example, the cross attention module 208B, in conjunction with the processor 204, can calculate how an aggregated message can be propagated from one object (e.g., image) to another. The cross attention module 208B, in conjunction with the processor 204, can determine an aggregated message for each directional pair of images so as to highlight the regions of interest in the images and how they relate to one another, thus making the extracted features more well-coordinated to each other.

For example, the cross attention module 208B, in conjunction with the processor 204, can determine an aggregated message that indicates the influence that a pocket region of a top image has on a pocket region of a bottoms image.

The cross attention module 208B, in conjunction with the processor 204, determines the aggregated message by first determining an affinity matrix between the vectors of each region of a first image of the first item type and the vectors of each region of a second image of the second item type. The cross attention module 208B, in conjunction with the processor 204, can then determine an aggregated message for the first image based on the second image based on normalization of the affinity matrix (e.g., using softmax normalization).

The fusion module 208C may comprise code or software, executable by the processor 204, for combining information. The fusion module 208C, in conjunction with the processor 204, can combine aggregated messages for the regions of an image with the vector that is representative of the image. As such, the fusion module 208C, in conjunction with the processor 204, can determine the overall influence (e.g., compatibility influence) a region of an image has over a region of another image while taking the original region vector into account.

Furthermore, the fusion module 208C, in conjunction with the processor 204, can filter out irrelevant or negative signals (e.g., mismatched signals) from the aggregated messages with respect to the original feature vector of the region of the image. The fusion module 208C, in conjunction with the processor 204, can include a learnable filter (e.g., gate) for each region channel between images. For example, the learnable filter can be learned using a machine learning process. The fusion module 208C, in conjunction with the processor 204, can learn the gate using a one-layer feed forward network with ReLU (rectified linear unit) activation.

The fusion module 208C, in conjunction with the processor 204, can output fused region-wise feature elements that represent the region of an image and the influence another image's region has on the region of the image.

The processing computer 200 can determine unified embeddings for an image based on a plurality of fused region-wise feature elements for that image. The unified embedding can represent the image as a whole.

The machine learning module 208D may comprise code or software, executable by the processor 204, for performing a machine learning process. The machine learning module 208D, in conjunction with the processor 204, can determine one or more matching scores that indicate how well a set of images of different image types relate to one another.

The machine learning module 208D, in conjunction with the processor 204, can include a wide and deep tensor network. In particular, the machine learning module 208D, in conjunction with the processor 204, includes a wide network that pools a set of unified embeddings of each image that are being evaluated for compatibility to one vector. The machine learning module 208D, in conjunction with the processor 204, also includes a deep network that extracts a vector from the unified embeddings from each image that is being evaluated for compatibility by applying perceptron layers hierarchically to the unified embeddings.

The machine learning module 208D, in conjunction with the processor 204, can train the wide and deep networks jointly to enable the resulting model to obtain better feature interactions between the unified embeddings for the set of images being evaluated.

The network interface 206 may include an interface that can allow the computer 200 to communicate with external computers. The network interface 206 may enable the computer 200 to communicate data to and from another device (e.g., a database, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

IV. MATCHING SCORE DETERMINATION MODEL

In this section, the process for creating matching scores that indicate how well two or more images of item types match one another will be described.

Figure 3:
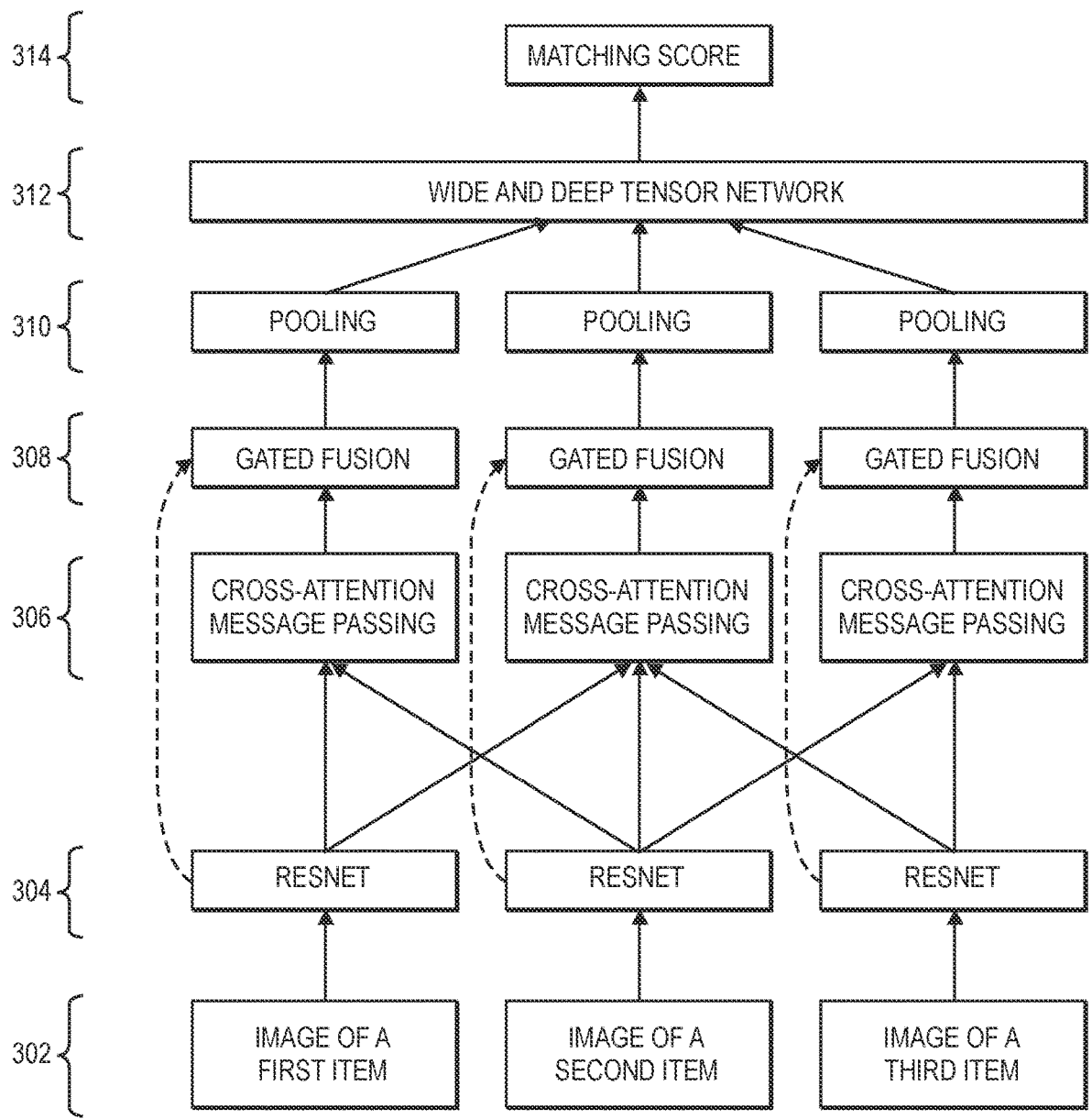
FIG. 3 shows a flow diagram illustrating a recommendation process according to some embodiments.

FIG. 3 shows a flowchart of a recommendation method according to embodiments. The method illustrated in FIG. 3 will be described in the context of a determining a matching score that may be indicative of how well three clothing items combine into a single outfit. It is understood, however, that the invention can be applied to other circumstances. The method illustrated in FIG. 3 can be performed by a computer, not shown, such as the computer 200 of FIG. 2.

First, region-wise features for each component of an outfit will be described. Then, a tensor network will be described to measure the compatibility of at least any triplet of images types (e.g., a top image, a bottom image, and a shoe image in an outfit). However, it is understood that embodiments are not limited to determining the compatibility of triplets of image types. The processing computer can determine compatibility between any number of images types (e.g., four image types, five image types, etc.). Embodiments can include two segments: a cross-attention message passing segment and a wide and deep tensor interaction segment. As such, embodiments are able to characterize local region-based patterns as well as global compatibility of the entire outfits. Additionally, embodiments provide for a K-pair loss function to discriminate a positive sample from multiple negative samples, which improves generalization performance.

A. Task Overview

A capsule wardrobe contains a subset of garments that mix and match well. As described herein, embodiments describe capsule wardrobe creation as the technical problem of selecting triplets among tops, bottoms, and shoes that maximize their compatibility. For example, a computer can determine matching scores associated with combinations of images of various item types. The images of item types can be images of tops, images of bottoms, and images of shoes. As another example, the item types can be skateboards, wheels, and grip tape, where the computer determines matching scores between combinations of the skateboards, wheels, and grip tape.

Specifically, embodiments use a top×bottom×shoe tensor $\chi \in \mathbb{R}^{M \times N \times L}$ to indicate the outfit events, where M, N, and L denote the number of tops, bottoms, and shoes, respectively. An entry $\chi_{pqr}=1$ if the triplet (e.g., a top image $I_t^{(p)}$, a bottom image $I_b^{(q)}$, and a shoe image $I_s^{(r)}$) creates a compatible outfit, $\chi_{pqr}=0$ otherwise. With regard to the notation $\chi_{1,3,2}=1$, this would indicate a matching or compatibility score for top number 1, bottom number 3, and shoes number 2. In some embodiments, the value can be between 0 and 1 to indicate a compatibility or matching score. Embodiments can predict an outfit compatibility score for those triplets that have not yet been observed (e.g., zero elements), which can be used for outfit recommendations. Embodiments are described in relation to fashion items, however, it is understood that embodiments can process any suitable items that are non-fashion related.

At step 302, the computer can obtain images to process for determination of a plurality of matching scores for compatibility of a set of images of different image types. For example, the images can be images of clothing items, furniture items, research papers, etc. The computer can process the images during steps 304-314 to determine a matching score that indicates how well the clothing items, illustrated in the input images, combine into an outfit. Embodiments are not limited to clothing items as inputs to the process of FIG. 3. For example, inputs can include any data that may be described in three dimensions (e.g., as in a three dimensional tensor). Additionally, input data of higher orders (e.g., higher dimensionalities) can be utilized.

In some embodiments, the first item type can be a first fashion item type, the second item type can be a second fashion item type, and the third item type can be a third fashion item type. In other embodiments, the first item type can be a first resource, the second item type can be a second resource, and the third item type can be a third resource. The first resource, the second resource, and the third resource can be resources made available, by a resource provider, to a resource user. For example, a resource can be a product.

As an illustrative example, the computer can obtain a first plurality of images of a first fashion item type (e.g., tops), a second plurality of images of a second fashion item type (e.g., bottoms), and a third plurality of images of a third fashion item type (e.g., shoes).

B. Region-Wise Feature Map

Beyond global colors and shapes, visual style is another key ingredient to describe clothing. Nevertheless, visual style is generally determined by some local attributes, such as collar, pocket, sleeve, etc. [3]. Inspired by recent advances in image reasoning [5, 33], embodiments build a visual reasoning model to enhance the region-based representations by considering the semantic relationships among the clothing regions.

At step 304, after obtaining the images, the computer can determine a set of regions of each image and extract feature(s) from each region. For example, the computer can determine a set of regions for each of the first plurality of images, the second plurality of images, and the third plurality of images. A region can be a portion of an image. For example, an image of the first fashion item type (e.g., a top) can include exemplary regions of, but not limited to, a collar region, a sleeve region, a pocket region, a button region, etc. In some embodiments, the computer can utilize a ResNet process to determine each region of each image of each fashion item type.

After determining the set of regions, the computer can generate a vector representing the region, for each region, in each set of regions of the first plurality of images, the second plurality of images, and the third plurality of images (e.g., T, S, B). The vector can be a feature vector. The vector can include any suitable dimensionality to properly represent the region from which the vector is extracted. The vector can be indicative of a plurality of aspects of each region. For example, the vector can be indicative of color, texture, size, pattern, shape, etc.

In particular, embodiments utilize ResNet50 [17], which is machine learning software pre-trained on ImageNet, to extract visual features from the images (e.g., the tops, the bottoms, and the shoes) and to identify regions corresponding to those visual features. For ease of explanation, superscripts may not be included in subsequent passages. For example, in $I_t^{(p)} \rightarrow I_t$, $I_b^{(q)} \rightarrow I_b$, and $I_s^{(r)} \rightarrow I_s$, the superscripts for a specific top p, bottom q, and shoe r will not be included. Note that in this notation, t, b, and s refer to tops, bottoms, and shoe in general, whereas p, q, and r refer to a specific top, bottom, and shoe. For a particular top image $I_t$, embodiments obtain the top image's region-wise feature maps $T'=[t'_1, \ldots, t'_{R_t}] \in \mathbb{R}^{D \times R_t}$ from intermediate convolutional layers (e.g., conv5_3), where $R_t$ is the number of regions of the top and $t'_1 \in \mathbb{R}^D$ is the feature vector corresponding to the first region of an image. These ResNet feature maps have been shown to be able to capture key context from local regions, with strong performance and transferability [30, 33]. Similarly, the feature maps for a bottom image $I_b$ and a shoe image $I_s$ are denoted as $B'=[b'_1, \ldots, b'_{R_b}] \in \mathbb{R}^{D \times R_b}$ and $S'=[s'_1, \ldots, s'_{R_s}] \in \mathbb{R}^{D \times R_s}$ respectively. Due to the limited size of the datasets, embodiments can freeze the weights of ResNet50 and apply three fully-connected neural networks $g(\Theta; \cdot)$ (using ResNet50 or other suitable machine learning techniques) to transform the features into d-dimensional embeddings:

$$T=g(\Theta_t;T'), B=g(\Theta_b;B'), S=g(\Theta_s;S') \quad (1)$$

where $T \in \mathbb{R}^{d \times R_t}$, $B \in \mathbb{R}^{d \times R_b}$, and $S \in \mathbb{R}^{d \times R_s}$ are new feature maps for the top, bottom, and shoe, respectively. $l_2$ normalization is also applied on their columns to improve training stability. Taking advantage of these feature maps, embodiments next introduce a cross-attention message passing strategy to locally detect region-wise feature interactions among tops, bottoms, and shoes.

C. Cross-Attention Message Passing

Given an outfit, one natural way to measure the compatibility is to exploit how the messages pass within the path: top↔bottom↔shoe, where bottoms serve as bridges connecting tops and shoes. As such, embodiments can extract the most salient feature matching from two sub-paths: top↔bottom and bottom↔shoe, while maintaining the flexibility to combine tops and shoes in versatile ways to create as many stylish outfits (e.g., designated by a large matching score) as possible.

The cross-attention module can contain two parts. The first part is attentive pairwise matching, which calculates how the aggregated messages can be propagated from one object to the other. Further, linearized softmax attention is also proposed to reduce time complexity. The second part is visual fusion gate units, which are capable of regulating how much of the messages propagates between two objects. These two parts will be described in further detail below.

At step 306, after generating the vectors representing the regions, the computer generates aggregated messages (e.g., $\overline{T}$, $\overline{S}$, $\overline{B}$) corresponding to combinations of images of different fashion types using the vectors in step 304. For example, the computer can perform a cross-attention message passing process to determine how much each image affects a neighboring image. A neighboring image can be the image(s) placed to the right or left (as illustrated in FIG. 3) of an image. During data processing at step 306, the computer determines values that represent how much each image affects its neighboring images. For example, the first fashion item (e.g., a top) can affect the second fashion item (e.g., a bottom). The second fashion item (e.g., a bottom) can affect the first fashion item (e.g., a top) and the third fashion item (e.g., a shoe). The third fashion item (e.g., a shoe) can affect the second fashion item (e.g., a bottom). However, it is understood that a fashion item of any image can affect any other fashion item of another image and is not limited to only affecting the neighboring images. For example, in some embodiments, the third fashion item (e.g., a shoe) can affect the first fashion item (e.g., a top).

The cross-attention messaging between two images may not be symmetrical. For example, the first fashion item (e.g., a top) can affect the second fashion item (e.g., a bottom) by a different amount than the effect of the second fashion item of the first fashion item.

The computer can determine an aggregated message based on an affinity between the vectors of each region of a first image and the vectors of each region of a second image. The affinity matrix indicates the amount of influence of the vectors of each region of the second image on the vectors of each region of the first image. For example, when determining the effect of the second image on the first image, the affinity between the vectors can be determined, for example, using a dot product. Each region's vector of the first image can be dotted with each region's vector of the second image to from an affinity matrix. The computer can use the affinity matrix to weight each of the second image's region's vectors to determine a plurality of vectors that represent an affinity between the two images, which can be referred to as aggregated messages. Thus, embodiments of the invention can generate a plurality of aggregated messages using the vectors corresponding to combinations of images of different types of items, the images being from a first plurality of images including a first item type, second plurality of images of a second item type, and a third plurality of images of a third item type. In some embodiments, the first item type (e.g., shoes) is proximate to the second item type (e.g., a pair of pants) and is distal to the third item type (e.g., a shirt) when the first item type, the second item type, and the third item type are used together by a user in combination.

For example, the computer can generate the aggregated messages by determining an affinity matrix between the vectors of each region of a first image of the first item type and the vectors of each region of a second image of the second item type. The computer can then determine an aggregated message for the first image based on the second image based on softmax normalization of the affinity matrix. An aggregated message can be determined for each directional pair of images the first plurality of images of the first item type and the second plurality of images of the second item type. An aggregated message of the aggregated messages can indicate an amount of influence one image's region has on another image's region.

As an example, the computer can generate a plurality of first image aggregated messages based on an influence of each image of the plurality of second images on each image of the plurality of first images. The computer can also generate a plurality of second image aggregated messages based on an influence of each image of the plurality of first images on each image of the plurality of second images and the influence of each image of the plurality of third images on each image of the plurality of second images. The computer can generate a plurality of third image aggregated messages based on an influence of each image of the plurality of second images on each image of the plurality of third images.

1. Attentive Pairwise Matching

Embodiments generate cross attention maps for each sub-path between items types so as to highlight the regions of interest of those items, making extracted features more well-coordinated to one another. In particular, four pairwise message passing routines are defined in the fashion item example:

bottom→top, top→bottom, bottom→shoe, and shoe→bottom.

These routines enable the information flow across full-body outfits, and select the most salient feature maps to show their local compatibility. Note that, the routines:

bottom→top and top→bottom are asymmetric due to the cross-attention mechanism [27]. An efficient attention method to speed up the message passing will be described.

For example, messages can be passed for bottom→top. Given the region-wise features $T=[t_1, \ldots, t_{R_t}] \in \mathbb{R}^{d \times R_t}$(top) and $B=[b_1, \ldots, b_{R_b}] \in \mathbb{R}^{d \times b}$ (bottom) obtained from Eq. (1), T and B can be enriched by transferring region-to-region messages between top items and bottom items. Formally, a bottom-top affinity matrix $A \in \mathbb{R}^{R_b \times R_t}$ is computed for all possible pairs of regions [27, 42]:

$$A_{ij} = b_i^T \cdot t_j, 1 \leq i \leq R_b, 1 \leq j \leq R_t \quad (2)$$

where A is the cosine similarity that represents the affinity between the i-th region of bottom and the j-th region of top. Here the cosine similarity has $\|t_i\|_2 = \|b_i\|_2 = 1$ due to the $l_2$ normalization in Eq. (1). To derive the cross-attention for bottom-to-top, a weighted combination can be determined by:

$$\bar{t}_j^{(b \to t)} = \Sigma_{i=1}^{R_b} \alpha_{ij}^{(b \to t)} b_i, \text{ and } \alpha_{ij}^{(b \to t)} = (e^{A_{ij}/\tau}) / (\Sigma_{i=1}^{R_b} e^{A_{ij}/\tau}) \quad (3)$$

where $\alpha^{(b \to t)}$ is the bottom-to-top attention matrix by softmax normalizing the affinity matrix A across the bottom-dimension; t is the temperature determining how flat the softmax is; $\bar{t}_j^{(b \to t)}$ denotes the bottom features attended by the j-th region of top (i.e., $\bar{t}_j^{(b \to t)}$ can be characterized as the amount of influence that each region of the bottom has on a particular region of an image of a particular top), and $T = [\bar{t}_1^{(b \to t)}, \ldots, \bar{t}_{R_t}^{(b \to t)}] \in \mathbb{R}^{d \times R_t}$ can be regarded as the aggregated messages to be passed from bottom to top (i.e., in one example, T can be an amount of influence that a particular bottom has on a particular region on a top, such as the influence of a pair of pants to a shirt pocket).

As per linearized attention, the Eq. (3) is a standard definition of attention, where the computational cost of softmax attention is quadratic for all queries (e.g., O(dR²) in this case, where R=min{$R_t$, $R_p$}). The same is true for the memory requirements since the full attention matrix must be stored explicitly to compute the gradients. Combing Eq. (2) and Eq. (3), a generalized attention form can be written as [24]:

$$\bar{t}_j^{(b \to t)} = \sum_{i=1}^{R_b} sim(b_i, t_j) b_i / \sum_{i=1}^{R_b} sim(b_i, t_j)) \quad (4)$$

where $sim(b_i, t_j)$ can be any similarity function with non-negative property. Eq. (4) is equivalent to Eq. (3) if the similarity function is substituted with $$sim(b_i, t_j) = e^{b_i^T \cdot t_j / \tau}.$$

Several recent studies [11, 24, 32, 51] have attempted to reduce the complexity of attention mechanisms, from quadratic to linear, by using kernel functions. One elegant approach is the Linear Transformer [24], which designs a kernel function as:

$$sim(b_i, t_j) = \phi(b_i)^T \phi(t_j), \text{ and}$$

$$\phi(x) = elu(x) + 1,$$

where elu(•) is the exponential linear unit. The choice of elu(•) is motivated by non-zero gradients on the negative parts. The complexity reduction is mainly due to a linearization of the softmax. However, the approximation error can be large in some cases [7, 46]. Softmax linearization techniques for transformers are still underexplored. The existing approximation are either oversimplified or mathematically well explained but very complex [11, 32].

Alternatively, embodiments utilize an effective approximated function by using the Taylor Series $$\left(e^x = \sum_{n=0}^{\infty} \frac{1}{n!} x^n\right).$$

Given the function $$sim(b_i, t_j) = e^{b_i^T \cdot t_j/\tau}.$$

in the softmax attention, its Taylor Series is:

$$e^{b_i^T \cdot t_j/\tau} = 1 + b_i^T \cdot t_j/\tau + \frac{(b_i^T \cdot t_j/\tau)^2}{2!} + \cdots$$

Intuitively, the mapping function $\phi(\cdot)$ that corresponds to the exponential function in the softmax should be infinite dimensional, which makes the linearization of exact softmax attention infeasible. Here embodiments can truncate the high-order terms, and obtain the following linear form:

$$sim(b_i, t_j) \approx 1 + b_i^T \cdot t_j/\tau \qquad (5)$$

Specifically, l2 normalization enforces that $-1 \leq b_i^T \cdot t_j \leq 1$, and the temperature is generally chosen with $\tau \geq 1$ [20], $sim(b_i, t_j)$ is thus subject to non-negative constraint. To show the benefits of Taylor series, Eq. (5) can be substituted into Eq. (4) and use the fact that $(xT\ y)x=(xxT)y$, the Eq. (4) can be further simplified as:

$$\bar{t}_j^{(b \to t)} = \qquad (6)$$

$$\sum_{i=1}^{R_b}(1 + b_i^T \cdot t_j/\tau)b_i / \sum_{i=1}^{R_b}(1 + b_i^T + t_j/\tau) = \frac{\tau \sum_{i=1}^{R_b} b_i + \sum_{i=1}^{R_b}(b_i b_i^T)t_j}{\tau R_b + t_j^T \sum_{i=1}^{R_b} b_i}$$

Further the terms $\tau\Sigma_{i=1}^{R_b} b_i$, $\Sigma_{i=1}^{R_b}(b_i b_i^T)$, $\tau R_b$, and $t_j^T \Sigma_{i=1}^{R_b} b_i$ are independent on index j, which can be computed once and reused for every query. As a result, Eq. (6) can lightly get rid of the exponential function in the standard softmax attention (e.g., Eq. (3)) without any additional cost. This yields a much simpler attention structure and achieves linear time complexity for all queries.

To this end, embodiments can efficiently compute the aggregated messages $\bar{T}^{(b \to t)} \in \mathbb{R}^{d \times R_t}$ for the path bottom-to-top. Likewise, embodiments can obtain the aggregated messages $\bar{B}^{(t \to b)} \in \mathbb{R}^{d \times R_b}$, $\bar{B}^{(s \to b)} \in \mathbb{R}^{d \times R_b}$, and $\bar{S}^{(b \to s)} \in \mathbb{R}^{d \times R_s}$ for the paths: top-to-bottom, shoe-to-bottom, and bottom-to-shoe, respectively.

2. Visual Fusion Gate

In general, the aggregated messages (e.g., $\bar{T}^{(b \to t)}$) can contain irrelevant or negative (mismatched) signals with respect to original features (e.g., T), which need to be filtered out during pairwise matching. For example, a "blue jean" should pass more signals to a "white t-shirt", but less signals to a "swimsuit".

To better align knowledge between two segments, embodiments further adopt gated mechanisms to allow the model to control what information should be propagated across different modalities [49]. Consequently, the proposed model is able to fuse two objects to a large extent for matched regions, and suppress the fusion for mismatched regions. Fuse the bottom-to-top messages $\bar{T}^{(b \to t)} \in \mathbb{R}^{d \times R_t}$ and the original top features $T \in \mathbb{R}^{d \times R_t}$ will be described in further detail.

At step 308, after generating the aggregated messages, the computer can generate a plurality of fused region-wise feature elements (e.g., $\tilde{T}$, $\tilde{S}$, $\tilde{B}$). Each fused region-wise feature element formed from an aggregated message and the vectors representing the regions from an image (e.g., T, S, B). The fused region-wise feature elements can be vectors resulting from the combination of the vectors representing the regions from an image (e.g., as determined at step 304) and the aggregated messages representing the effect of one image's regions on the regions of the other image. Each fused region-wise feature element of the plurality of fused region-wise feature elements corresponds to a region in the set of regions corresponding to an image of the first plurality of images, the second plurality of images, or the third plurality of images.

In some embodiments, during step 308, the computer can also filter the aggregated messages using a gate when computing the fused region-wise feature elements. For example, the computer can filter out trivial messages provided from one image to another in the aggregated message. For example, the computer can filter out irrelevant or negative (e.g., mismatched) signals with respect to the original features (e.g., T).

Recall that $t_j$ is the original feature of top, and $\bar{t}_i^{(b \to t)}$ is the message to be passed from bottom to top, embodiments utilize a learnable gate for each region channel:

$$g_i^{(b \to t)} = \sigma(t_i \odot \bar{t}_i^{(b \to t)}), 1 \leq i \leq R_t \qquad (7)$$

where $\odot$ denotes the Hadamard product, $\sigma(\cdot)$ is the sigmoid function, and $g_i^{(b \to t)} \in \mathbb{R}^d$ is the gate for i-th pair of regions, whose elements are normalized between 0 (no fusion) and 1 (complete fusion), $g_i^{(b \to t)}$ can be a particular gate for a region of a top, t, taking into account the influence of an image of a particular bottom. Thereafter, the region-level gates can be represented as $G^{(b \to t)} = [g_1, \ldots, g_{R_t}] \in \mathbb{R}^{d \times R_t}$, which can help to filter trivial messages. $G^{(b \to t)}$ can be considered to be a collection of the particular gates, for the particular regions of the top as influenced by an image of a particular bottom. Besides, to preserve the original features T that should not be intensively fused, a residual connection is also applied:

$$\tilde{T} = T + \mathcal{F}^{(b \to t)}(G^{(b \to t)} \odot (T \oplus \bar{T}^{(b \to t)})) \qquad (8)$$

where $\mathcal{F}^{(b \to t)}(\cdot)$ is a one-layer feed forward network with ReLU activation, $\oplus$ is the element-wise summation, and $\tilde{T} \in \mathbb{R}^{d \times R_t}$ is the fused region-wise features for top clothing. $\tilde{T}$ can be considered a collection of vectors that represent regions, respectively, of a top image as influenced by a bottom, while taking into account original vectors for the regions of the top to filter out irrelevant or negative influences. The residual connection also helps gradients flow through the layers to improve training stability.

Similarly, the gated units for bottom and shoe can be:

$$\tilde{B} = B + \mathcal{F}^{(t \to b)}(G^{(t \to b)} \odot (B \oplus \bar{B}^{(t \to b)})) + \mathcal{F}^{(s \to b)}(G^{(s \to b)} \odot (B \oplus \bar{B}^{(s \to b)}))$$

$$\tilde{S} = S + \mathcal{F}^{(b \to s)}(G^{(b \to s)} \odot (S \oplus \bar{S}^{(b \to s)})) \qquad (9)$$

where $\tilde{B} \in \mathbb{R}^{d \times R_b}$, $\tilde{S} \in \mathbb{R}^{d \times R_s}$ are the fused region-wise features for bottom and shoe, respectively. The bottoms can receive both cross-modal messages from tops and shoes concurrently, according the path: top $\leftrightarrow$ bottom $\leftrightarrow$ shoe.

At step 310, after determining the fused region-wise elements, the computer can generate a plurality of unified embeddings (e.g., $\hat{t}$, $\hat{s}$, $\hat{b}$) for the first, second, and third plurality of images. The unified embedding for each image can be a vector that represents that image. A unified embedding can be a single vector determined from the plurality of vectors that represent the plurality of regions of an image. Note that since the plurality of unified embeddings are creating using fused region-wise elements, which are in turn created using aggregated messages in the previously described plurality of aggregated messages, the plurality of unified embeddings are indirectly created using the aggregated messages in the plurality of aggregated messages.

For example, the computer can perform a pooling operation to summarize the region-wise features into a compact vector (e.g., the unified embedding) for a whole image. In particular, the computer can perform a mean-pooling operation that may take an average over the regions. The unified embeddings (also referred to as unified vectors) contain both the original features of the image as well as the messages passed from the neighboring images, which is capable of capturing more informative feature interplay, such as local compatibility. Furthermore, the pooling operation can embed the visual features into a $\hat{d}$-dimensional joint space, which can be used to measure full-body style compatibility and fashionability (e.g., an outfit).

As an example, the computer can generate the plurality of unified embeddings by first generating a first plurality of unified embeddings for the first plurality of images. Each unified embedding of the first plurality of unified embeddings is generated for each image of the first plurality of images based on the fused region-wise feature elements for the regions included in the image. The computer can then generate a second plurality of unified embeddings for the second plurality of images. Each unified embedding of the second plurality of unified embeddings is generated for each image of the second plurality of images based on the fused region-wise feature elements for the regions included in the image. The computer can then generate a third plurality of unified embeddings for the third plurality of images. Each unified embedding of the third plurality of unified embeddings is generated for each image of the third plurality of images based on the fused region-wise feature elements for the regions included in the image.

Finally, pooling operations can be used to summarize the region-wise features into a compact vector for a whole image [22, 27]. To be specific, given fused features $\tilde{T}$, $\tilde{B}$, and $\tilde{S}$, embodiments can utilize a mean-pooling operation (e.g., average over regions) with three subsequent fully-connected layers $g(\theta; \cdot)$ to obtain the final vectors:

$$\hat{t}=g(\hat{\Theta}_t; \text{avg\_pool}(\tilde{T})), \hat{b}=g(\hat{\Theta}_b; \text{avg\_pool}(\tilde{B})), \hat{s}=g(\hat{\Theta}_s; \text{avg\_pool}(\tilde{S})), \quad (10)$$

where $\hat{t} \in \mathbb{R}^{\hat{d}}$, $\hat{b} \in \mathbb{R}^{\hat{d}}$, and $\hat{s} \in \mathbb{R}^{\hat{d}}$ are unified representations for the whole images of top, bottom, and shoe, respectively. To this end, the unified vectors contain both the original features as well as the messages passing from their neighbors, which is capable of capturing more informative feature interplay, such as local compatibility. In addition, Eq. (10) aims to embed the visual features into a $\hat{d}$-dimensional joint space, which can be used to measure compatibility via a tensor network.

D. Tensor Network

At steps 312 and 314, after determining unified embeddings, the computer can create matching score(s) associated with combinations of the images of the first, second, and third fashion item types using the plurality of unified embeddings and a machine learning model.

The machine learning model can be a wide and deep tensor network that comprises a wide network model that pools the plurality of unified embeddings into a first vector and a deep network that extracts a second vector from the plurality of unified embeddings by applying perceptron layers hierarchically. The first vector and the second vector are projected by a projection matrix in the machine learning model and input into a sigmoid function to form a matching score.

1. Wide and Deep Learning

In this subsection, measurement of the global compatibility among image item types (e.g., tops, bottoms, and shoes) will be described. Specifically, given a top image $I_t^{(p)}$, a bottom image $I_b^{(q)}$, and a shoe image $I_s^{(r)}$, unified embeddings $\hat{t}_p$, $b_q$, and $\hat{s}_r$ can be obtained via Eq. (10). To estimate their visual compatibility score, embodiments can utilize a wide and deep tensor network:

$$\hat{\chi}_{pqr} = \sigma\left(W \times \begin{bmatrix} \hat{t}_p \odot b_q \odot \hat{s}_r \\ MLP(\hat{t}_p, b_q, \hat{s}_r) \end{bmatrix}\right) \quad (11)$$

where $\sigma(\cdot)$ is the sigmoid function, and W is used to project the concatenated vector to a final score. The term $[\hat{t}_p \odot b_q \odot \hat{s}_r]$ is a wide network that pools a set of embeddings to one vector, and more importantly, it does not introduce extra model parameter. On the other hand, $MLP(\hat{t}_p, b_q, \hat{s}_r)$ is a deep network that extracts a vector from outfit embeddings by applying perceptron layers hierarchically. Joint training wide and deep networks enables the model to obtain better feature interactions among the unified embeddings for an outfit.

Compared to multi-linear tensor models (e.g., CP or Tucker [26]) embodiments provides for a system that learns non-linear feature interactions for multi-aspect tensor data. This greatly facilitates to improve the expressive power of tensor machines. These hybrid architectures combine the benefits of memorization generalization that can provide more insight for improving the performance of recommender systems.

2. K-Pair Loss Objective

To learn model parameters, embodiments can utilize a margin-based ranking loss function [8]. The margin-based ranking loss function can encourage discrimination between positive triplets and negative triplets. The loss function can minimize the following ranking criterion:

$$\mathcal{L}(\Theta) = \Sigma_{(p,q,r) \in T}[1+f(p',q',r')-f(p,q,r)]_+$$

where $[x]_+ = \max(x, 0)$, $f(\cdot)$, and $\Theta$ are the predictive function and model parameters in Eq. (11), respectively. T denotes the training set, in which each triplet (p, q, r) is a positive sample (e.g., $\chi_{pqr}=1$), and (p', q', r') is a negative triplet corresponding to the positive (p, q, r, which can be randomly generated such that $\chi_{p'q'r'}==0$.

Although the above contrastive loss can learn the model parameters efficiently, it often suffers from slow convergence and poor local optima [36]. These issues arise from the fact that the contrastive loss only compares a positive sample with one negative sample at a single update of the model parameters. As a result, the embeddings of a positive sample is only guaranteed to be far from the selected negative sample, but not necessarily the others.

Inspired by K-pair loss [36], embodiments attempt to identify a positive example from multiple negative samples.

Given one positive sample $(p, q, r) \in T$ and its K negative samples $\{(p'_k, q'_k, r'_k)\}_{k=1}^{K}$ the K-pair contrastive loss is defined as $$\mathcal{L}(\Theta) = \sum_{(p,q,r) \in T} \log \frac{\exp(f(p, q, r))}{\exp(f(p, q, r)) + \sum_{k=1}^{K} \exp(f(p'_k, q'_k, r'_k))} \quad (12)$$

The K-pair loss recruits multiple negative samples for each update, which accelerates the convergence and provides better optima. Specially, when K=1, the Eq. (12) becomes $\pounds_1(\Theta) = \Sigma_{(p, q, r) \in T} \log(1+\exp(f(p', q', r')-f(p, q, r)))$, which is optimally equivalent to the margin-based ranking loss [36].

3. Computational Complexity

The time complexity of TensorNet, for each training triplet, mainly comes from three modules. For cross-attention message passing module, it takes O(dR) to compute the pairwise messages, where d is the embedding dimension in Eq. (1) and $R=\max(R_t, R_b, R_s)$. For the visual gate units, the time cost of fusing features is $O(d^2R)$. For wide and deep tensor layer, the cost of wide component is $O(\hat{d})$ for its vector pooling. The matrix multiplication in deep component is $O(\Sigma_{h=1}^{H} \hat{d}_h \hat{d}_{h-1})$, where H is the number of hidden layers in MLP and $\hat{d}_h$ is the size of the h-th hidden layer, with $\hat{d}_0 = \hat{d}$. Although the K-pair loss takes more time than the margin-based ranking loss, an effective batch construction can be used to identify one positive sample from multiple negative samples simultaneously [36]. Therefore, the overall time complexity of TensorNet is $O(d^2R + \Sigma_{h=1}^{H} \hat{d}_h \hat{d}_{h-1})$ in total.

E. Further Processing

After step 314, after creating matching scores associated with combinations of the images of the first item type, the second item type, and the third item type, the computer can perform further processing. For example, the computer can determine the largest matching score, then provide the largest matching score to a downstream device or a user of the processing computer.

In other embodiments, the processing computer can provide the matching scores to a downstream device, where the downstream device can evaluate the matching scores depending upon any suitable criteria set by the downstream device. In some embodiments, the system can output recommended combinations of items types, and then either present those combinations to an end user, or take some action based on the recommendation(s). For example, a particular combination of item types (e.g., a particular pair of shoes, a particular pair of pants, and a particular shirt, could be automatically purchased using a pre-existing account and can be automatically shipped to the user.

V. EXPERIMENT

Embodiments are evaluated using two real-world datasets: Polyvore and iFashion. The following technical questions will be discussed. Q1) How does TensorNet, according to embodiments, perform compared with state-of-the-art recommendation methods? Q2) Is the linearized attention capable of achieving similar performance with existing linear transformers? Q3) What is the contribution of various components in the TensorNet architecture (e.g., cross-attention mechanism, visual gated unit, wide and deep modules, K-pair loss.)?

A. Experimental Setup

Embodiments were evaluated using two fashion datasets: Polyvore and iFashion [8]. For both datasets, three high-level categories (e.g., top, bottom, and shoe) were collected from an outfit. Specifically, the low-level categories of each item were determined by its textual descriptions. Then, low-to-high category mappings were created to map any item into its corresponding high-level category. The top category contained 15 low-level categories: bandeau, blouse, button-down, button-up, cardigan, camisole, pullover, shirt, shrug, sweater, tank, tee, top, turtleneck, vest. The bottom category contained 15 low-level categories: bermuda, bottom, chino, jean, jogger, jumpsuit, kilt, legging, overall, pant, romper, skirt, short, skort, trouser. The shoe category contained 19 low-level categories: boot, brogue, clog, converse, espadrille, flat, footwear, gladiator, heel, loafer, mule, moccasin, pump, sandal, slingback, slipper, shoe, sneaker, wedge. From the datasets only outfits that have items in all three categories were kept for evaluation. The final statistics of the two datasets, after being processed into outfit triplets, are shown in Table 1, below.

TABLE 1

Dataset Statistics.

| Dataset | # Top | # Bottom | # Shoe | # Interactions |
|---|---|---|---|---|
| Polyvore | 15,806 | 14,869 | 15,706 | 28,360 |
| iFashion | 6,353 | 5,756 | 5,968 | 24,802 |

Embodiments are compared with matrix/tensor completion methods. While there are well established traditional tensor models (e.g., CP, Tucker, and their variants [21]), they suffer from high memory requirements caused by the process of flattening the entire tensors in each iteration, which leads to limited scalability. The comparison methods that are chosen allow for implementations of mini-batch training. Such methods are: 1) NeuMF [14]: a deep matrix method capturing non-linear interactions between users and items, 2) VBPR [13]: a Bayesian ranking method with visual signals, 3) PITF [28]: a linear tensor model for context-aware recommendation, 4) NTF [34]: a neural tensor model with feed-forward network, 5) DCFA [39], a tensor model with pre-trained image features, and 6) COSTCo [25]: a CNN-based tensor model for sparse data.

For matrix-based models, such as NeuMF and VBPR, to properly compare them to embodiments, the top-bottom-shoe tensor were projected into two bipartite matrices: top-bottom and bottom-shoe. The candidate triplets were then generated by jointly learning the two matrices. The parameters of the baselines were initialized as in the original papers and are then carefully tuned to achieve optimal performance for each dataset. Also, the methods VBPR, DCFA, and TensorNet required pre-trained CNN features. For a fair comparison, these methods were implemented using ResNet50 (pre-trained on ImageNet) as the underlying network, where the output of layer pool5 (size: 2048) was used for the visual vectors for VBPR and DCFA, and the output of layer conv5_3 (size: 7×7×2048) was used for region-wise feature maps for TensorNet (e.g., each image is divided into 7×7 regions).

For TensorNet, the embedding dimension d in Eq. (1) is searched among {32, 64, 128, 256}, and the size of last fully-connected layer in Eq. (11) is set to $\hat{d}=d/2$. For deep component MLP(•) in Eq. (12), two hidden layers were employed and each layer sequentially decreased to half size of its input. The number of negative samples was set as K=2 in Eq. (13). Embodiments were implemented in TensorFlow with the Adam optimizer. The batch size and learning rate were tuned within {128, 256, 512, 1024} and {0.0005, 0.001, 0.005}, respectively.

The observed triplets were split into 80% training, 10% validation, and 10% test sets. The validation set was used for tuning hyper-parameters and the final performance was conducted on the test set. Two widely used metrics, Hit@n and NDCG@n [5, 14], were chosen to evaluate the performance. For evaluation, similar fill-in-the-blank procedures as in [5] were followed. Specifically, three fill-in-the-blank scenarios were considered: top-fill, bottom-fill, and shoe-fill. For the top-fill scenario, given each test triplet (p, q, r), the top p was replaced by p' so that the (p', q, r) was unobserved (e.g., $\chi_{p'qr}=0$). The compatibility scores were computed for these corrupted triplets as well as the true triplet. Based on the ranking results, Hit@n and NDCG@n were computed. A similar strategy was applied to the scenarios of bottom-fill (e.g., replacing bottom q by q' such that Xparr=0) and shoe-fill (e.g., replacing bottom r by r' such that $\chi_{pqr'}=0$).

B. Fill-In-the-Blank Performance Comparison (Q1)

Figure 4:
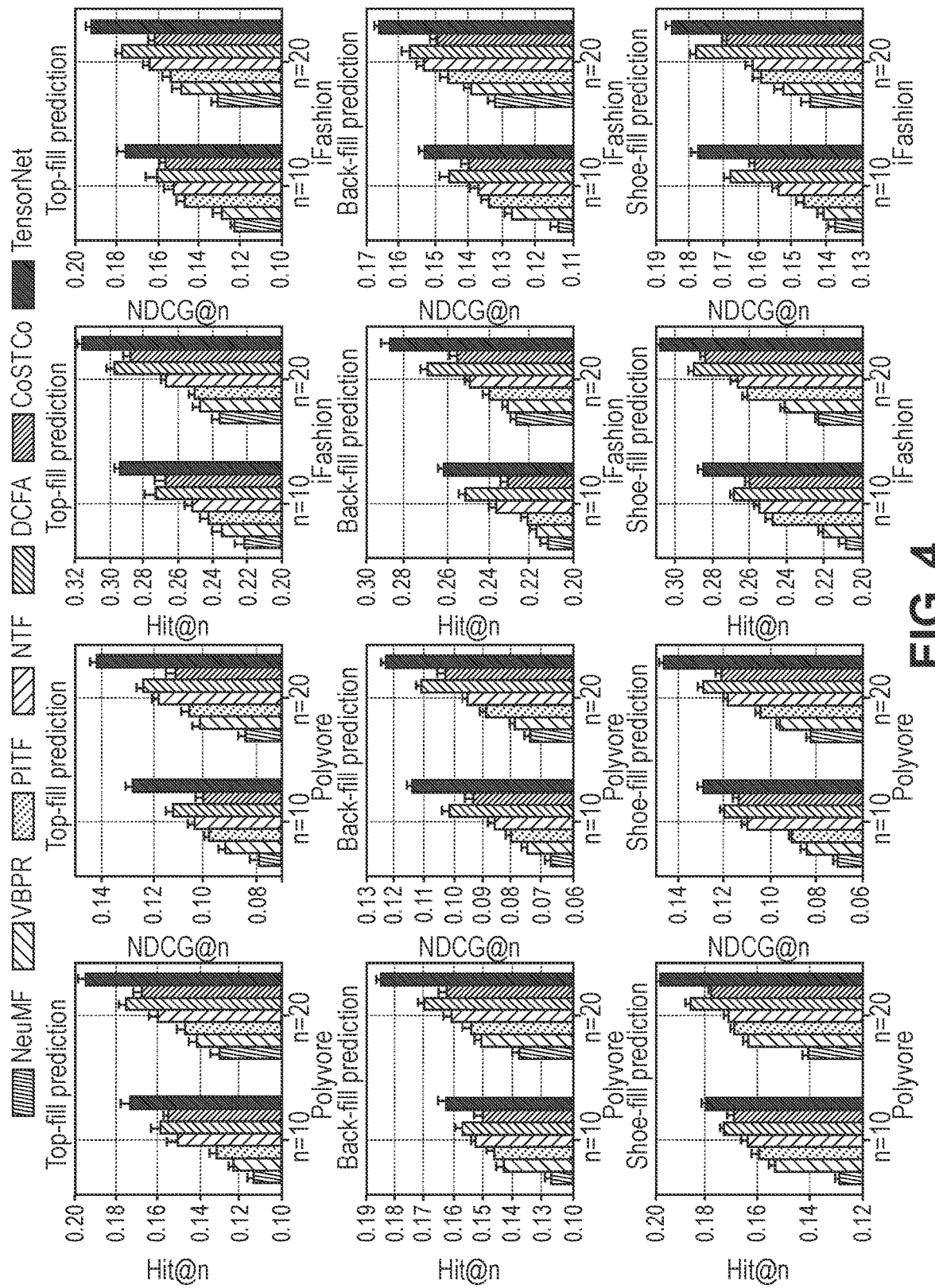
FIG. 4 illustrates fill-in-the-blank predictive results with error bars for different methods according to some embodiments.

The fill-in-the-blank performance will be compared here with the baselines under different scenarios. FIG. 4 summarizes the overall performance for the two datasets in terms of Hit@n and NDCG@n, where n is set to {10, 20}. The results for other settings of n will be omitted since they have similar trends in the experiments. As shown in FIG. 4, methods according to embodiments consistently yield the best performance across all cases. In addition, The following observations can be made.

Compared with matrix-based models (e.g., NeuMF and VBPR), tensor-based methods on average achieve better performance. This is attributed to the stronger ability of tensors when exploiting inherent relationships among multimodal data. In some cases, according to embodiments, simply projecting the top×bottom×shoe tensor into multiple matrices may break the original multi-way structure of an outfit and weaken the dependencies among tops, bottoms, and shoes.

Among tensor models, the approaches that incorporate visual signals (e.g., DCFA and embodiments) perform much better than pure tensor factorization methods (e.g., PITF, NTF, and COSTCo) that rely only on the triplet links. In building capsule wardrobes, one would not buy clothes without seeing their shapes, colors, styles, etc. The visual appearance of clothes thus plays an important role in compatibility. More importantly, integrating visual features helps alleviate cold-start issue, especially for sparse data like outfit dataset.

Methods according to embodiments achieve the best performance over all baselines, showing an average improvement of 9.16% and 10.33% than the state-of-the-art DCFA tensor model in terms of Hit@n and NDCG@n (n={10, 20}), respectively. The improvements of embodiments can come from the visual modules: cross-attention modules and visual gated units. As such, methods according to embodiments locally match regions of interest among tops, bottoms, and shoes, resulting in more appealing style compatibility. In addition, methods according to embodiments adopt the effectiveness of wide and deep learning strategies to capture fine-grained global compatibility for an outfit.

C. Linearized Attention Analysis (Q2)

Traditional softmax attention has been the computational bottleneck for many machine learning tasks. As described herein, the softmax attention can be linearized by using Taylor Series, resulting in better time and memory complexity. In this subsection, linearized methods according to embodiments (e.g., Eq. (7)) are compared with the standard softmax attention (e.g., Eq. (3)) and the linear transformer (e.g., Eq. (6)).

Table 2, below, shows the performance of different attention mechanism in terms of Hit@10 and NDCG@10, for Polyvore dataset. Similar results can be obtained for the iFashion dataset and are omitted here. The standard softmax attention achieves the best performance, but with quadratic complexity for both running time and memory space. Compared to the linear transformer, the linearized attention method according to embodiments gains average improvements of 3.43% on Hit@10 and 3.68% on NDCG@10. Overall, the experimental results show that the attention mechanism according to embodiments has a beneficial trade-off between the effectiveness and complexity.

Figure 5:
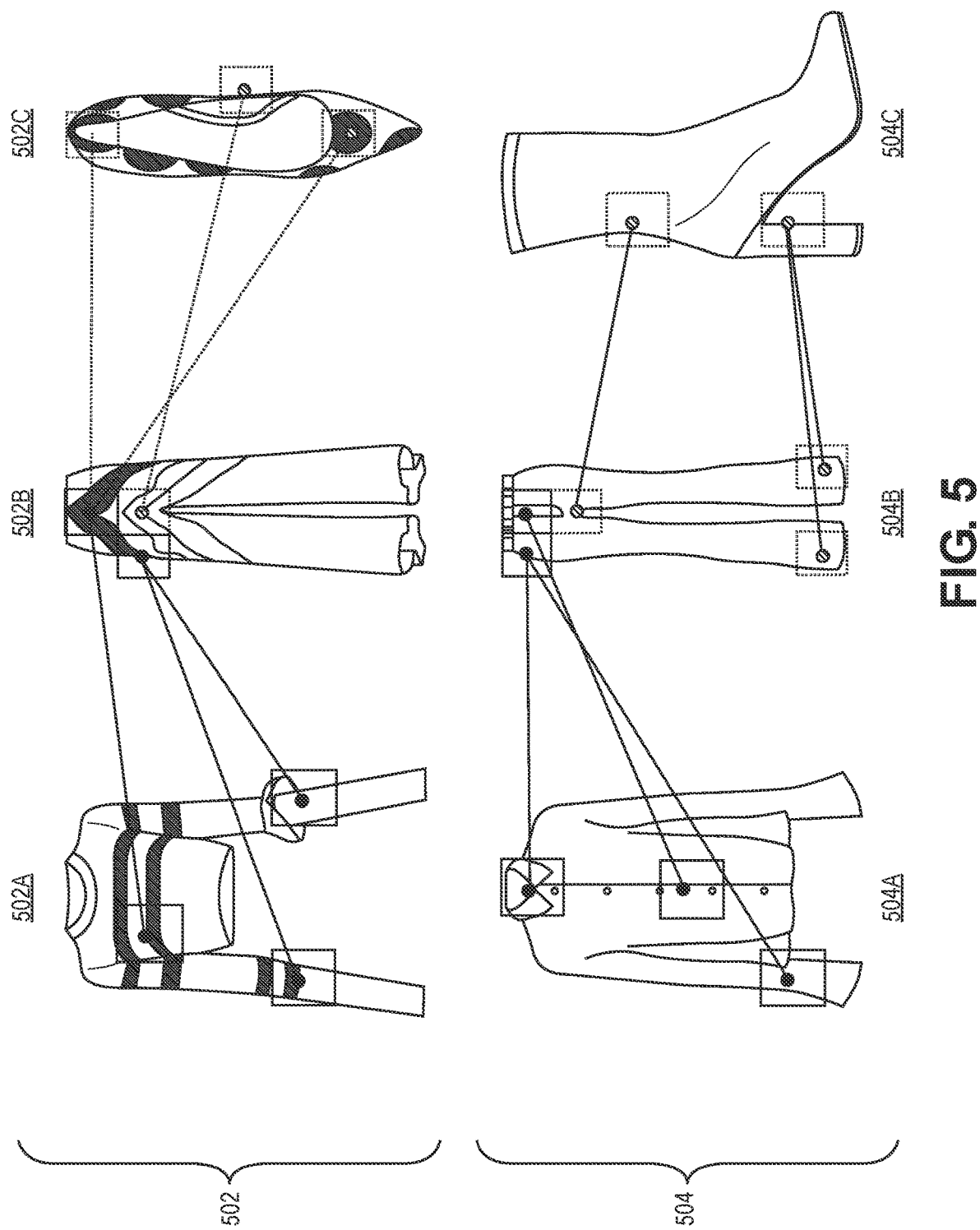
FIG. 5 illustrates a diagram of the top-3 pairwise salient matching patterns based on cross-attention maps according to some embodiments.

FIG. 5 also shows the top-3 pairwise salient matching patterns from the utilized cross-attention maps. As mentioned earlier, cross-attention maps can be used to measure the region-to-region compatibility among tops, bottoms, and shoes. As one can see from the outfit on the top row of FIG. 5 (e.g., 502), the portion that contributes to the matching between the pink sweater 502A and the wide-leg pants 502B are their stripe designs, and the matching between the wide-leg pants 502B and the pointy-toe shoes 502C are the pointy shapes in both items. For the outfit in the bottom row of FIG. 5 (e.g., 504), the matching between the shirt 504A and the boot-cut jeans 504B are their button designs, and the matching between the boot-cut jeans 504B and the booties 504C is the boot-cut silhouette and the high heels. These submodularity matching patterns can be further evaluated by fashion experts to see whether such region-to-region compatibility is aesthetically meaningful. In summary, the cross-attention map according to embodiments offers a unique tool for data-driven fashion advice in real-world applications.

TABLE 2

Performance comparison for different attention mechanisms on Polyvore dataset. The % Improv. row denotes the relative improvements of embodiments over the Linear Transformer. The best results are highlighted in bold and the second best ones are bolded and italicized.

| | Polyvore | | | | | |
| --- | --- | --- | --- | --- | --- | --- |
| | Top-fill scenario | | Bottom-fill scenario | | Shoe-fill scenario | |
| Metric | Hit@10 | NDCG@10 | Hit@10 | NDCG@10 | Hit@10 | NDCG@10 |
| Softmax Attention | 0.177 | 0.132 | 0.165 | 0.117 | 0.182 | 0.133 |
| Linear Transformer | 0.169 | 0.125 | 0.156 | 0.109 | 0.175 | 0.124 |

TABLE 2-continued

Performance comparison for different attention mechanisms on Polyvore dataset. The % Improv. row denotes the relative improvements of embodiments over the Linear Transformer. The best results are highlighted in bold and the second best ones are bolded and italicized.

| | Polyvore | | | | | |
|---|---|---|---|---|---|---|
| | Top-fill scenario | | Bottom-fill scenario | | Shoe-fill scenario | |
| Metric | Hit@10 | NDCG@10 | Hit@10 | NDCG@10 | Hit@10 | NDCG@10 |
| Embodiments | *0.174* | *0.128* | *0.163* | *0.114* | *0.180* | *0.129* |
| % Improv. | 2.96% | 2.10% | 4.49% | 4.59% | 2.86% | 4.03% |

D. Study of TensorNet (Q3)

The influence of each module according to embodiments was further investigated using ablation studies. For each variant, one network module was removed and the resulting performance was compared with the default TensorNet.

Table 3, below, shows the performance of the four variants on the Polyvore dataset. The results are summarized as follows. 1) The TensorNet-wide variant was only trained with the wide component in Eq. (12), which decreases the performance, verifying the effectiveness of the MLP in modeling non-linear feature interactions. 2) For the TensorNet-deep variant, removing the wide component also hurt the system performance. Presumably this is because the wide network is able to preserve low-level features, which is important in the wide and deep learning. 3) For the delete gate units case it was evaluated that the visual gate units can filter some irrelevant signals between two items, providing better results. 4) For the delete cross-attention module case it was evaluated that removing the cross-attention network significantly decreases the overall performance. This implies that the region-region matching is crucial to the outfit compatibility.

TABLE 3

Ablation analysis of embodiments

| Polyvore | Top-fill scenario | | | |
|---|---|---|---|---|
| Metric | H@10 | N@10 | H@20 | N@20 |
| Embodiments (TensorNet) | 0.174 | 0.128 | 0.195 | 0.142 |
| TensorNet-wide | 0.170 | 0.123 | 0.189 | 0.137 |
| TensorNet-deep | 0.172 | 0.125 | 0.192 | 0.140 |
| Del gate units | 0.164 | 0.122 | 0.186 | 0.135 |
| Del cross-attention | 0.161↓ | 0.119↓ | 0.1814↓ | 0.133↓ |

↓denotes a severe performance drop.
H and N are short for Hit and NDCG, respectively.

Figure 6:
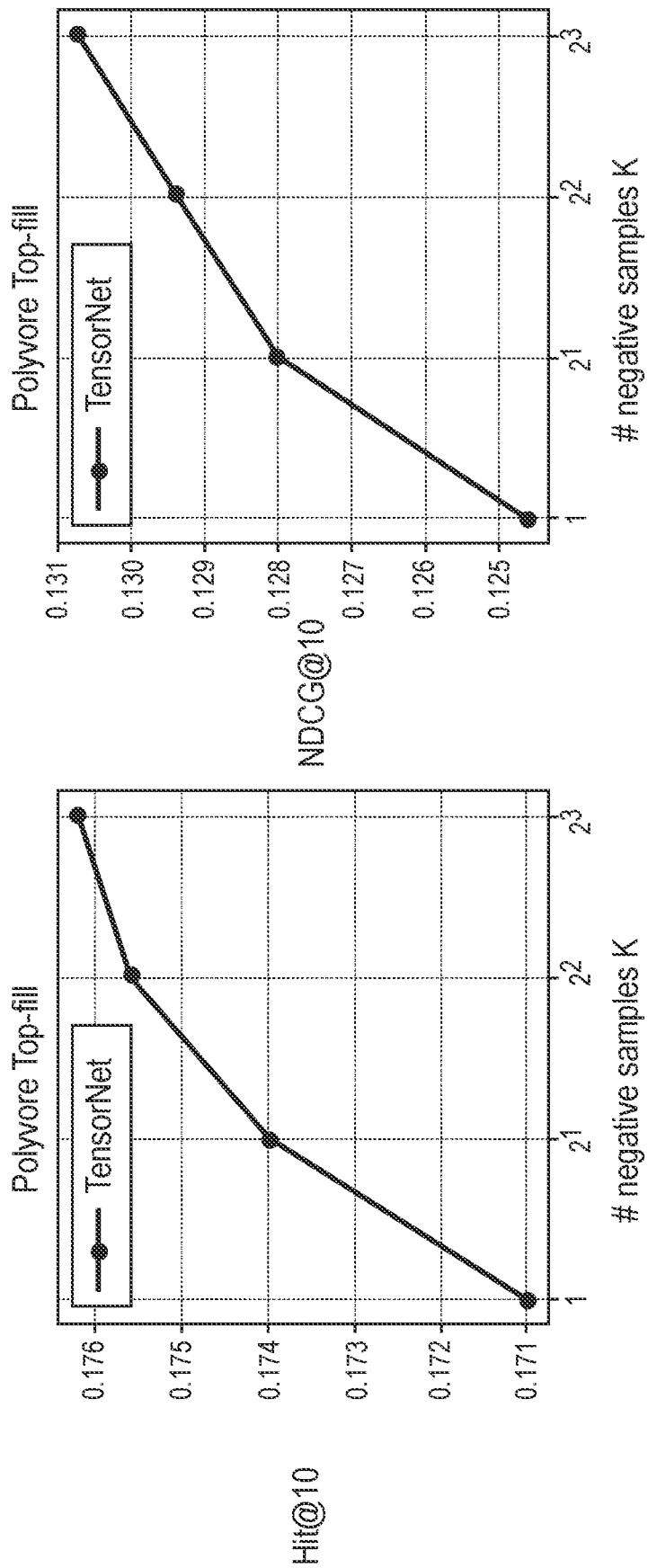
FIG. 6 shows a graph illustrating the impact of training multiple negative triplets with respect to one positive triplet simultaneously according to some embodiments.

FIG. 6 also shows the impact of training multiple negative triplets with respect to one positive triplet simultaneously, where K={1, 2, 4, 8}. It was observed that embodiments benefit from a larger K, indicating the effectiveness of K-pair loss function in the training. Nevertheless, larger K leads to more running time. It was determined that K=2 is reasonable setting in our cases.

VI. OTHER EMBODIMENTS

Embodiments can view the outfit compatibility problem in a core-piece settings, consider item proximity, and incorporate unsupervised region-wise feature map extraction.

Although the fashion dataset was used to evaluate the effectiveness of embodiments, embodiments are not limited to a fashion setting and has a broader impact due to two novel designs: 1) linear attention mechanism and 2) wide and deep tensor feature interaction.

A. Impact of Linearized Attention Mechanism

The linearized attention mechanism described herein can be used in a very wide range of applications, including natural language processing, computer vision, and others. For many of these applications, current state-of-the-art models use Softmax attention, whose both space and time complexity are quadratic. Embodiments achieve linear time complexity of both space and time, which can potentially scale up to large-scale industrial data. Embodiments further can reduce the complexity of Transformers/BER[1,2]T.

Embodiments can also learn sequential data, such as the financial transactions in authentication systems such as VCAS (Visa Consumer Authentication Service) and VDA (Visa Dynamic Network Analytics). For example, the computational bottleneck of current recurrent neural network is relatively high when training with very long sequential data (e.g., high frequency pan account). With the linearized attention mechanism described herein, embodiments can speed up any attention-based model without hurting the performance.

Scalable representation learning has been a core challenge for multiple AI projects, ranging from fraud detection (VDA, VCAS) to anomaly detection. In these projects, modeling temporal information is crucial like using velocity features and sequences. Embodiments can be utilized to ensure practicality of the AI solutions.

B. Impact of Wide and Deep Tensor Features

A goal of wide and deep tensors is to improve the feature interaction modeling for multi-object data. For instance, tabular data is ubiquitous in many real-world applications, such as recommender systems and fraud detection. Typically, each row of a tabular dataset corresponds to one object. Other systems, such as TabNet, which is a deep neural network (DNN) architecture for multi-object data, can only learn first-order feature interactions. Whereas embodiments utilize a neural tensor layer that can learn higher-order and non-linear feature interactions for real-world data by using the wide and deep learning strategies.

Embodiments of the disclosure have a number of advantages. For example, embodiments provide for a more accurate recommendation for the compatibility of the input images, while providing an optimized scalable process that reduces overall computational runtime.

VII. REFERENCES

[1] 1918. *Croonberg's Gazette of Fashions*. Number v. 6, books.google.com/books?id=vaA7AQAAMAAJ

[2] Evrim Acar, Tamara G Kolda, and Daniel M Dunlavy. 2011. All-at-once optimization for coupled matrix and tensor factorizations. *Computing Research Repository (CORR)*.

[3] Kenan E Ak, Ashraf A Kassim, Joo Hwee Lim, and Jo Yew Tham. 2018. Learning attribute representations with localization for flexible fashion search. In *Proceedings of the IEEE conference on computer vision and pattern recognition*. 7708-7717.

[4] Marina Alexander, Lenda Jo Connell, and Ann Beth Presley. 2005. Clothing fit preferences of young female adult consumers. *International Journal of Clothing Science and Technology* (2005).

[5] Peter Anderson, Xiaodong He, Chris Buehler, Damien Teney, Mark Johnson, Stephen Gould, and Lei Zhang. 2018. Bottom-up and top-down attention for image captioning and visual question answering. In *Proceedings of the IEEE conference on computer vision and pattern recognition*. 6077-6086.

[6] Ada S Ballin. 1885. *The science of dress in theory and practice*. Sampson, Low, Marston, Searle and Rivington.

[7] Irwan Bello. 2021. LambdaNetworks: Modeling long-range Interactions without Attention. In *International Conference on Learning Representations*.

[8] Antoine Bordes, Nicolas Usunier, Alberto Garcia-Duran, Jason Weston, and Oksana Yakhnenko. 2013. Translating embeddings for modeling multi-relational data. In *Neural Information Processing Systems*. 1-9.

[9] Wen Chen, Pipei Huang, Jiaming Xu, Xin Guo, Cheng Guo, Fei Sun, Chao Li, Andreas Pfadler, Huan Zhao, and Binqiang Zhao. 2019. POG: personalized outfit generation for fashion recommendation at Alibaba iFashion. In *Proceedings of the 25th ACM SIGKDD international conference on knowledge discovery & data mining*. 2662-2670.

[10] Heng-Tze Cheng, Levent Koc, Jeremiah Harmsen, Tal Shaked, Tushar Chandra, Hrishi Aradhye, Glen Anderson, Greg Corrado, Wei Chai, Mustafa Ispir, et al. 2016. Wide & deep learning for recommender systems. In *Proceedings of the 1st workshop on deep learning for recommender systems*. 7-10.

[11] Krzysztof Marcin Choromanski, Valerii Likhosherstov, David Dohan, Xingyou Song, Andreea Gane, Tamas Sarlos, Peter Hawkins, Jared Quincy Davis, Afroz Mohiuddin, Lukasz Kaiser, David Benjamin Belanger, Lucy J Colwell, and Adrian Weller. 2021. Rethinking Attention with Performers. In *International Conference on Learning Representations*.

[12] Elizabeth L Cline. 2019. The *conscious closet: the revolutionary guide to looking good while doing good*. Plume.

[13] Christina Dean, Sofia Tärneberg, and Hannah Lane. 2017. *Dress [with] Sense: The Practical Guide to a Conscious Closet*. Thames & Hudson.

[14] Joanne Entwistle. 2015. *The fashioned body: Fashion, dress and social theory*. John Wiley & Sons.

[15] Hancheng Ge, James Caverlee, and Haokai Lu. 2016. Taper: A contextual tensor-based approach for personalized expert recommendation. In *Proceedings of the 10th ACM Conference on Recommender Systems*. 261-268.

[16] Xintong Han, Zuxuan Wu, Yu-Gang Jiang, and Larry S. Davis. 2017. Learning Fashion Compatibility with Bidirectional LSTMs. In *Proceedings of the 2017 ACM on Multimedia Conference, MM 2017, Mountain View, CA, USA, Oct. 23-27, 2017*. 1078-1086.

[17] Kaiming He, Xiangyu Zhang, Shaoqing Ren, and Jian Sun. 2016. Deep residual learning for image recognition. In *Proceedings of the IEEE conference on computer vision and pattern recognition*. 770-778.

[18] Lifang He, Chun-Ta Lu, Guixiang Ma, Shen Wang, Linlin Shen, S Yu Philip, and Ann B Ragin. 2017. Kernelized support tensor machines. In *International Conference on Machine Learning*. PMLR, 1442-1451.

[19] Xiangnan He, Lizi Liao, Hanwang Zhang, Liqiang Nie, Xia Hu, and Tat-Seng Chua. 2017. Neural collaborative filtering. In *Proceedings of the 26th international conference on world wide web*. 173-182.

[20] Geoffrey Hinton, Oriol Vinyals, and Jeff Dean. 2015. Distilling the knowledge in a neural network. *NeurIPS Deep Learning and Representation Learning Workshop* (2015).

[21] Ruibing Hou, Hong Chang, Bingpeng M A, Shiguang Shan, and Xilin Chen. 2019. Cross Attention Network for Few-shot Classification. In *Advances in Neural Information Processing Systems*.

[22] Zhong Ji, Haoran Wang, Jungong Han, and Yanwei Pang. 2019. Saliency-Guided Attention Network for Image-Sentence Matching. In *Proceedings of the IEEE/CVF International Conference on Computer Vision (ICCV)*.

[23] Alexandros Karatzoglou, Xavier Amatriain, Linas Baltrunas, and Nuria Oliver. 2010. Multiverse recommendation: n-dimensional tensor factorization for context-aware collaborative filtering. In *Proceedings of the fourth ACM conference on Recommender systems*. 79-86.

[24] Angelos Katharopoulos, Apoorv Vyas, Nikolaos Pappas, and François Fleuret. 2020. Transformers are rnns: Fast autoregressive transformers with linear attention. In *International Conference on Machine Learning*. 5156-5165.

[25] M Hadi Kiapour, Kota Yamaguchi, Alexander C Berg, and Tamara L Berg. 2014. Hipster wars: Discovering elements of fashion styles. In *European conference on computer vision*. Springer, 472-488.

[26] Tamara G Kolda and Brett W Bader. 2009. Tensor decompositions and applications. *SIAM review* 51, 3 (2009), 455-500.

[27] Kuang-Huei Lee, Xi Chen, Gang Hua, Houdong Hu, and Xiaodong He. 2018. Stacked cross attention for image-text matching. In *Proceedings of the European Conference on Computer Vision*. 201-216.

[28] Hanpeng Liu, Yaguang Li, Michael Tsang, and Yan Liu. 2019. COSTCo: A neural tensor completion model for sparse tensors. In *Proceedings of the 25th ACM SIGKDD International Conference on Knowledge Discovery & Data Mining*. 324-334.

[29] Tianqiang Liu, Aaron Hertzmann, Wilmot Li, and Thomas Funkhouser. 2015. Style compatibility for 3D furniture models. *ACM Transactions on Graphics (TOG)* 34, 4 (2015), 1-9.

[30] Hyeonseob Nam, Jung-Woo Ha, and Jeonghee Kim. 2017. Dual attention networks for multimodal reasoning and matching. In *Proceedings of the IEEE conference on computer vision and pattern recognition*. 299-307.

[31] Cousin Nelly. 1872. *Dolly's Outfit: Teaching children how to dress their dolls, assisted by cut-out and made-up patterns of each article of dress*, books.google.com/books?id=Yve2bg3ipCIC

[32] Hao Peng, Nikolaos Pappas, Dani Yogatama, Roy Schwartz, Noah Smith, and Lingpeng Kong. 2021. Random Feature Attention. In *International Conference on Learning Representations*.

[33] Shaoqing Ren, Kaiming He, Ross Girshick, and Jian Sun. 2015. Faster R-CNN: Towards Real-Time Object Detection with Region Proposal Networks. In *Advances in Neural Information Processing Systems*.
[34] Steffen Rendle and Lars Schmidt-Thieme. 2010. Pairwise interaction tensor factorization for personalized tag recommendation. In *Proceedings of the third ACM international conference on Web search and data mining*. 81-90.
[35] James Shelley. 2020. The Concept of the Aesthetic. In *The Stanford Encyclopedia of Philosophy* (winter 2020 ed.), Edward N. Zalta (Ed.). Metaphysics Research Lab, Stanford University.
[36] Kihyuk Sohn. 2016. Improved deep metric learning with multi-class n-pair loss objective. In *Proceedings of the 30th International Conference on Neural Information Processing Systems*. 1857-1865.
[37] Qingquan Song, Xiao Huang, Hancheng Ge, James Caverlee, and Xia Hu. 2017. Multi-aspect streaming tensor completion. In *Proceedings of the 23rd ACM SIGKDD International Conference on Knowledge Discovery and Data Mining*. 435-443.
[38] Xuemeng Song, Fuli Feng, Jinhuan Liu, Zekun Li, Liqiang Nie, and Jun Ma. 2017. NeuroStylist: Neural Compatibility Modeling for Clothing Matching. In *Proceedings of the 2017 ACM on Multimedia Conference, MM 2017, Mountain View, CA, USA, Oct. 23-27, 2017*. 753-761.
[39] Guang-Lu Sun, Xiao Wu, Hong-Han Chen, and Qiang Peng. 2015. Clothing style recognition using fashion attribute detection. In *Proceedings of the 8th international conference on mobile multimedia communications*. 145-148.
[40] Monica Titton. 2015. Fashionable personae: Self-identity and enactments of fashion narratives in fashion blogs. *Fashion Theory* 19, 2 (2015), 201-220.
[41] Mariya I. Vasileva, Bryan A. Plummer, Krishna Dusad, Shreya Rajpal, Ranjitha Kumar, and David A. Forsyth. 2018. Learning Type-Aware Embeddings for Fashion Compatibility. In *Computer Vision—ECCV 2018-15th European Conference, Munich, Germany, Sep. 8-14, 2018, Proceedings, Part XVI*. 405-421.
[42] Ashish Vaswani, Noam Shazeer, Niki Parmar, Jakob Uszkoreit, Llion Jones, Aidan N Gomez, Łukasz Kaiser, and Illia Polosukhin. 2017. Attention is All you Need. In *Advances in Neural Information Processing Systems*.
[43] Zihao Wang, Xihui Liu, Hongsheng Li, Lu Sheng, Junjie Yan, Xiaogang Wang, and Jing Shao. 2019. Camp: Cross-modal adaptive message passing for text-image retrieval. In *Proceedings of the IEEE/CVF International Conference on Computer Vision*. 5764-5773.
[44] Xi Wei, Tianzhu Zhang, Yan Li, Yongdong Zhang, and Feng Wu. 2020. Multi-modality cross attention network for image and sentence matching. In *Proceedings of the IEEE/CVF Conference on Computer Vision and Pattern Recognition*. 10941-10950.
[45] Xian Wu, Baoxu Shi, Yuxiao Dong, Chao Huang, and Nitesh V Chawla. 2019. Neural tensor factorization for temporal interaction learning. In *Proceedings of the Twelfth ACM International Conference on Web Search and Data Mining*. 537-545.
[46] Yunyang Xiong, Zhanpeng Zeng, Rudrasis Chakraborty, Mingxing Tan, Glenn Fung, Yin Li, and Vikas Singh. 2021. Nyströmformer: A Nystrom-based Algorithm for Approximating Self-Attention. In *Proceedings of the AAAI Conference on Artificial Intelligence*.
[47] Zenglin Xu, Feng Yan, and Yuan Alan Qi. 2012. Infinite Tucker Decomposition: Nonparametric Bayesian Models for Multiway Data Analysis. In *International Conference on Machine Learning*.
[48] Xun Yang, Yunshan Ma, Lizi Liao, Meng Wang, and Tat-Seng Chua. 2019. TransNFCM: Translation-Based Neural Fashion Compatibility Modeling. In *The Thirty-Third AAAI Conference on Artificial Intelligence, AAAI 2019, The Thirty—First Innovative Applications of Artificial Intelligence Conference, IAAI 2019, The Ninth AAAI Symposium on Educational Advances in Artificial Intelligence, EAAI 2019, Honolulu, Hawaii, USA, Jan. 27-Feb. 1, 2019*. 403-410.
[49] Linwei Ye, Mrigank Rochan, Zhi Liu, and Yang Wang. 2019. Cross-modal self-attention network for referring image segmentation. In *Proceedings of the IEEE/CVF Conference on Computer Vision and Pattern Recognition*. 10502-10511.
[50] Wenhui Yu, Huidi Zhang, Xiangnan He, Xu Chen, Li Xiong, and Zheng Qin. 2018. Aesthetic-based clothing recommendation. In *Proceedings of the 2018 world wide web conference*. 649-658.
[51] Manzil Zaheer, Guru Guruganesh, Kumar Avinava Dubey, Joshua Ainslie, Chris Alberti, Santiago Ontanon, Philip Pham, Anirudh Ravula, Qifan Wang, Li Yang, and Amr Ahmed. 2020. Big Bird: Transformers for Longer Sequences. In *Advances in Neural Information Processing Systems*.
[52] Ziwei Zhu, Xia Hu, and James Caverlee. 2018. Fairness-aware tensor-based recommendation. In *Proceedings of the 27th ACM International Conference on Information and Knowledge Management*. 1153-1162.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   determining, by a processing computer, a set of regions for each of a first plurality of images of a first item type, a second plurality of images of a second item type, and a third plurality of images of a third item type;
   for each region in each set of regions of the first plurality of images, the second plurality of images, and the third plurality of images, generating, by the processing computer, a vector representing the region;
   generating, by the processing computer, a plurality of aggregated messages using the vectors corresponding to combinations of images of different types of items, the images being from the first, second, and third plurality of images;
   generating, by the processing computer, unified embeddings for the images in the first, second, and third plurality of images, respectively, using aggregated messages in the plurality of aggregated messages; and
   creating, by the processing computer, matching scores associated with combinations of the images of the first item type, the second item type, and the third item type using the unified embeddings and a machine learning model.

2. The method of claim 1, further comprising:
   generating, by the processing computer, a plurality of fused region-wise feature elements using the plurality of aggregated messages, and wherein the unified embeddings are formed using fused region-wise feature elements in the plurality of fused region-wise feature elements.

3. The method of claim 1, wherein the first item type is proximate to the second item type and is distal to the third item type when the first item type, the second item type, and the third item type are used together by a user in combination.

4. The method of claim 1, further comprising:
   generating, by the processing computer, a plurality of fused region-wise feature elements using the plurality of aggregated messages, and wherein the unified embeddings are formed using fused region-wise feature elements in the plurality of fused region-wise feature elements and vectors representing the regions from the images.

5. The method of claim 1 further comprising:
   transmitting, by the processing computer, the matching scores to a downstream device.

6. The method of claim 1, wherein generating the plurality of aggregated messages using the vectors corresponding to combinations of images of different types of items, the images being from the first, second, and third plurality of images comprises:
   for an aggregated message in the plurality of aggregated messages,
   determining an affinity matrix between the vectors of each region of a first image of the first item type and the vectors of each region of a second image of the second item type; and
   determining, by the processing computer, the aggregated message for the first image based on the second image based on softmax normalization of the affinity matrix.

7. The method of claim 6, wherein the affinity matrix indicates an amount of influence of the vectors of each region of the second image on the vectors of each region of the first image.

8. The method of claim 6, wherein the aggregated message is determined for each directional pair of images.

9. The method of claim 1, wherein the machine learning model is a wide and deep tensor network that comprises a wide network model that pools the unified embeddings into a first vector and a deep network that extracts a second vector from the unified embeddings by applying perceptron layers hierarchically.

10. The method of claim 1, wherein the first item type, the second item type, and the third item type are different types of articles of clothing.

11. A processing computer comprising:
    a processor; and
    a computer-readable medium coupled to the processor, the computer-readable medium comprising code executable by the processor for implementing a method comprising:
    determining a set of regions for each of a first plurality of images of a first item type, a second plurality of images of a second item type, and a third plurality of images of a third item type;
    for each region in each set of regions of the first plurality of images, the second plurality of images, and the third plurality of images, generating a vector representing the region;
    generating a plurality of aggregated messages using the vectors corresponding to combinations of images of different types of items, the images being from the first, second, and third plurality of images;
    generating unified embeddings for the images in the first, second, and third plurality of images, respectively, using aggregated messages in the plurality of aggregated messages; and
    creating matching scores associated with combinations of the images of the first item type, the second item type, and the third item type using the unified embeddings and a machine learning model.

12. The processing computer of claim 11 further comprising:
    an image region determination module;
    a cross attention module;
    a fusion module; and
    a machine learning module.

13. The processing computer of claim 11, wherein the method further comprises:
    obtaining the first plurality of images of the first item type, the second plurality of images of the second item type, and the third plurality of images of the third item type from a database.

14. The processing computer of claim 11, wherein an aggregated message of the plurality of aggregated messages indicate an amount of influence one region of an image has on another region of another image.

15. The processing computer of claim 11, wherein the first item type is proximate to the second item type and is distal to the third item type when the first item type, the second item type, and the third item type are used together by a user in combination, wherein the first item type, the second item type, and the third item type are articles of clothing.

16. The processing computer of claim 11, wherein after creating matching scores associated with combinations of the images of the first item type, the second item type, and the third item type the method further comprises:
   determining a largest matching score; and
   providing the largest matching score to a downstream device or a user of the processing computer.

17. The processing computer of claim 11, wherein the first item type is a first resource, the second item type is a second resource, and the third item type is a third resource, wherein the first resource, the second resource, and the third resource are resources made available, by a resource provider, to a resource user.

18. The processing computer of claim 11, wherein generating the plurality of aggregated messages using the vectors corresponding to combinations of images of different types of items, the images being from the first, second, and third plurality of images comprises:
   for an aggregated message in the plurality of aggregated messages,
   determining an affinity matrix between the vectors of each region of a first image of the first item type and the vectors of each region of a second image of the second item type; and
   determining, by the processing computer, the aggregated message for the first image based on the second image based on softmax normalization of the affinity matrix.

19. The processing computer of claim 11, wherein the processing computer is a server computer.

20. The processing computer of claim 11, wherein the matching scores indicate compatibilities of the combinations of the first item types, the second item types, and the third item types.

* * * * *